United States Patent
Lee et al.

(10) Patent No.: US 12,250,713 B2
(45) Date of Patent: Mar. 11, 2025

(54) METHOD AND DEVICE FOR SELECTING TRANSMISSION RESOURCE IN NR V2X

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 619 days.

(21) Appl. No.: 17/608,679

(22) PCT Filed: May 4, 2020

(86) PCT No.: PCT/KR2020/005904
§ 371 (c)(1),
(2) Date: Nov. 3, 2021

(87) PCT Pub. No.: WO2020/226399
PCT Pub. Date: Nov. 12, 2020

(65) Prior Publication Data
US 2022/0217738 A1 Jul. 7, 2022

Related U.S. Application Data

(60) Provisional application No. 62/843,338, filed on May 3, 2019.

(51) Int. Cl.
*H04W 72/56* (2023.01)
*H04W 72/54* (2023.01)
*H04W 72/566* (2023.01)

(52) U.S. Cl.
CPC ......... *H04W 72/569* (2023.01); *H04W 72/54* (2023.01)

(58) Field of Classification Search
CPC ..... H04W 72/569; H04W 72/54; H04W 4/40; H04W 72/02; H04W 92/18
See application file for complete search history.

(56) References Cited

U.S. PATENT DOCUMENTS

2018/0213438 A1* 7/2018 Muraoka .............. H04W 72/04
2020/0137782 A1* 4/2020 Su ......................... H04L 1/0004
(Continued)

FOREIGN PATENT DOCUMENTS

WO 2017116108 7/2017

OTHER PUBLICATIONS

3GPP TR 38.885, 3rd Generation Partnership Project; Technical Specification Group Radio Access Network; NR; Study on Vehicle-to-Everything, Mar. 28, 2019 (Year: 2019).*

(Continued)

*Primary Examiner* — Mounir Moutaouakil
(74) *Attorney, Agent, or Firm* — BRYAN CAVE LEIGHTON PAISNER LLP

(57) ABSTRACT

Provided are a method for a first device to perform wireless communication, and a device for supporting same. The method may comprise the steps of: selecting a first sidelink (SL) transmission resource within a selection window on the basis of sensing in a first time interval; selecting a second SL transmission resource on the basis of sensing in a second time interval; and performing SL transmission by using the second SL transmission resource. Here, the second time interval may be a time interval prior to the first SL transmission resource.

20 Claims, 23 Drawing Sheets

(56) References Cited

U.S. PATENT DOCUMENTS

2021/0219187 A1* 7/2021 Lee .................... H04W 4/40
2021/0385694 A1* 12/2021 Freda ................ H04W 28/0268
2022/0174682 A1* 6/2022 Li ..................... H04W 72/1263

OTHER PUBLICATIONS

Catt, Discussion on resource allocation mechanism for sidelink Mode 2 in NR V2X, R1-1905353, 3GPP TSG RAN WG1 #96bis, Xi'an, China, Apr. 3, 2019, see pp. 1-10 and figures 1-4.
Intel Corporation, Sidelink Resources Allocation Design for NR V2X Communication, R1-1904296, 3GPP TSG RAN WG1 #96bis, Xi'an, China, Apr. 3, 2019, see pp. 1-15 and figures 1-3.
Huawei, et al., Sidelink resource allocation mode 2 for NR V2X, R1-1903947, 3GPP TSG RAN WG1 #96bis, Xi'an, China, Apr. 2, 2019, see pp. 1-14.
NTT Docomo, Inc., NR Sidelink Resources Allocation Mechanism Mode 2, R1-1905423, 3GPP TSG RAN WG1 #96bis, Xi'an, China, Apr. 3, 2019, see pp. 1-5.

\* cited by examiner

FIG. 4
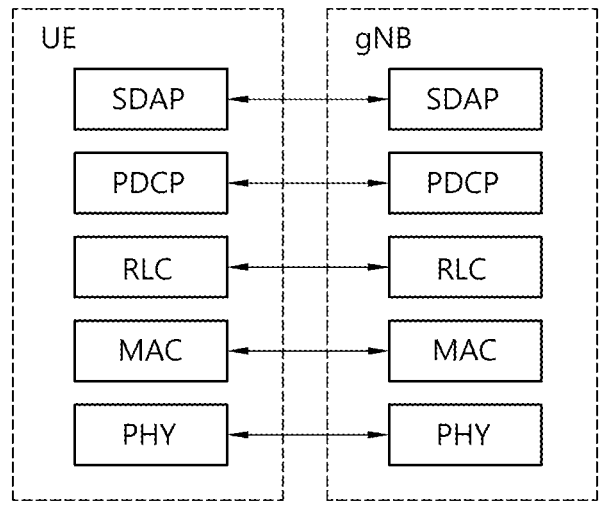
(a)
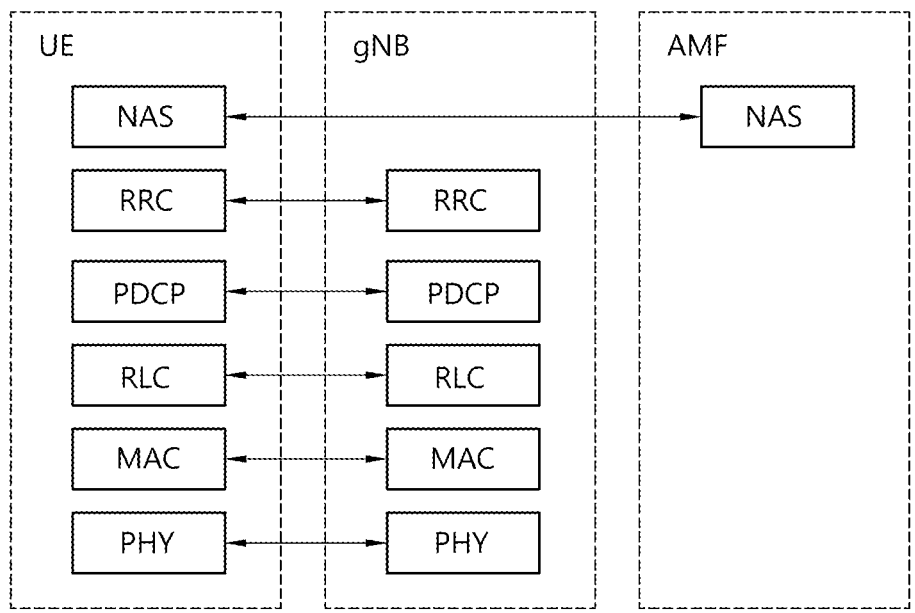
(b)

FIG. 8
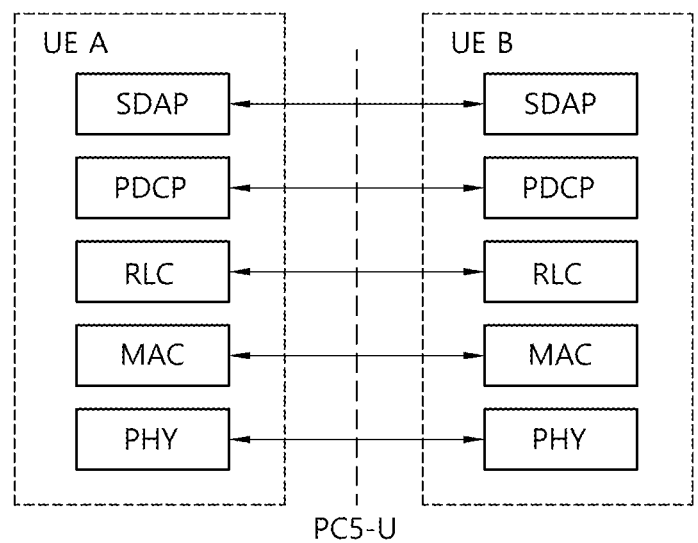
(a)
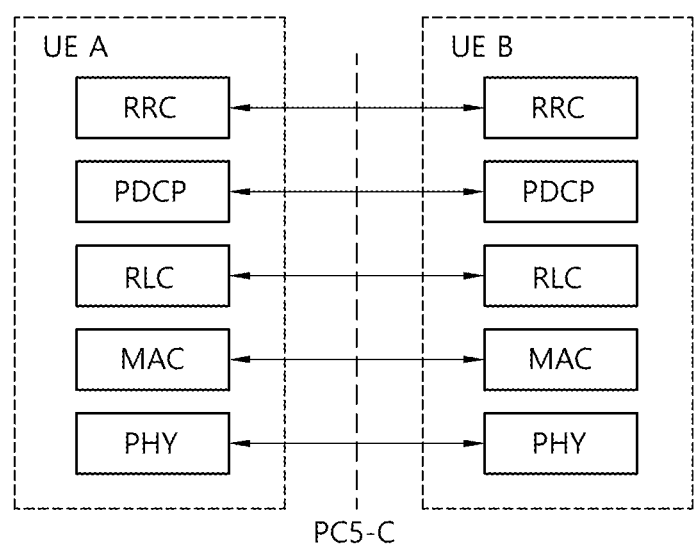
(b)

METHOD AND DEVICE FOR SELECTING TRANSMISSION RESOURCE IN NR V2X

This application is the National Stage filing under 35 U.S.C. 371 of International Application No. PCT/KR2020/005904 filed on May 4, 2020, which claims priority to U.S. Provisional Application No. 62/843,338 filed on May 3, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, a TX UE having packet(s) and/or channel(s) to transmit may perform a sensing operation for a transmission resource candidate set within a sensing window of a pre-configured (time) length. In addition, for example, the TX UE may exclude resource(s) with high interference from the transmission resource candidate set within the selection window, and the TX UE may (randomly) select its own transmission resource from the remaining resources. Additionally, in order to further mitigate the problem of transmission resource conflict between different TX UEs, the TX UE may continue to perform the sensing operation until the TX UE actually uses its own transmission resource in the selection window for packet transmission and/or channel transmission. If the TX UE determines that its transmission resource collides/overlaps with transmission resource(s) of other TX UE(s) through such a sensing operation, a procedure for the TX UE to reselect and/or cancel transmission resource(s) needs to be proposed.

Technical Solutions

In one embodiment, a method for performing, by a first device, wireless communication may be provided. The method may comprise: selecting a first sidelink (SL) transmission resource within a selection window, based on sensing for a first time interval; selecting a second SL transmission resource, based on sensing for a second time interval; and performing SL transmission using the second SL transmission resource. Herein, the second time interval may be a time interval prior to the first SL transmission resource.

In one embodiment, a first device configured to perform wireless communication may be provided. The first device may comprise: one or more memories storing instructions; one or more transceivers; and one or more processors connected to the one or more memories and the one or more transceivers. The one or more processors may execute the instructions to: select a first sidelink (SL) transmission resource within a selection window, based on sensing for a first time interval; select a second SL transmission resource, based on sensing for a second time interval; and perform SL transmission using the second SL transmission resource. Herein, the second time interval may be a time interval prior to the first SL transmission resource.

Effects of the Disclosure

The user equipment (UE) may efficiently perform SL communication.

BRIEF DESCRIPTION OF THE DRAWINGS

FIG. 4 shows a radio protocol architecture, based on an embodiment of the present disclosure.

FIG. 8 shows a radio protocol architecture for a SL communication, based on an embodiment of the present disclosure.

DESCRIPTION OF EXEMPLARY EMBODIMENTS

Figure 1:
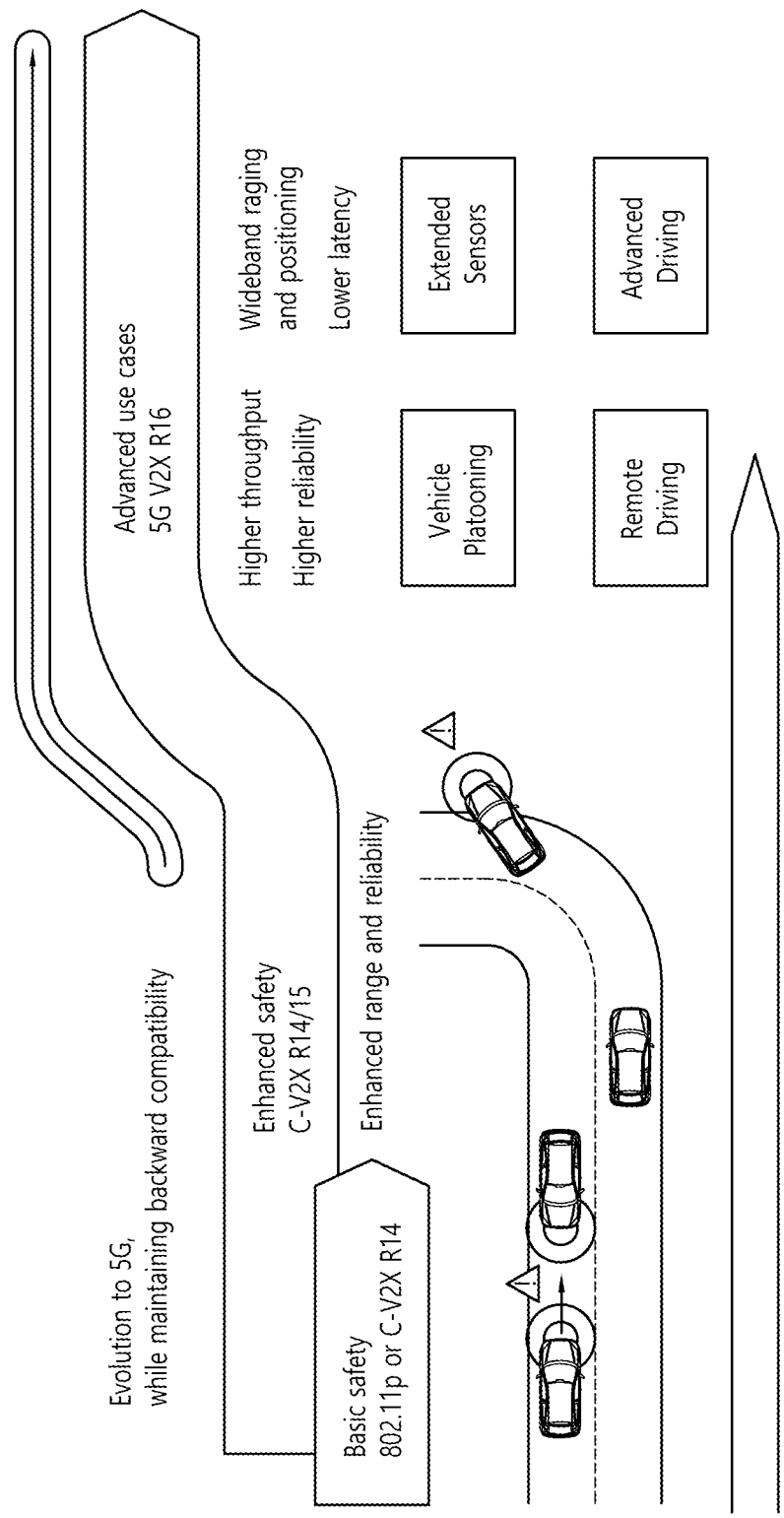
FIG. 1 is a drawing for describing V2X communication based on NR, compared to V2X communication based on RAT used before NR.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

A technical feature described individually in one figure in the present disclosure may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
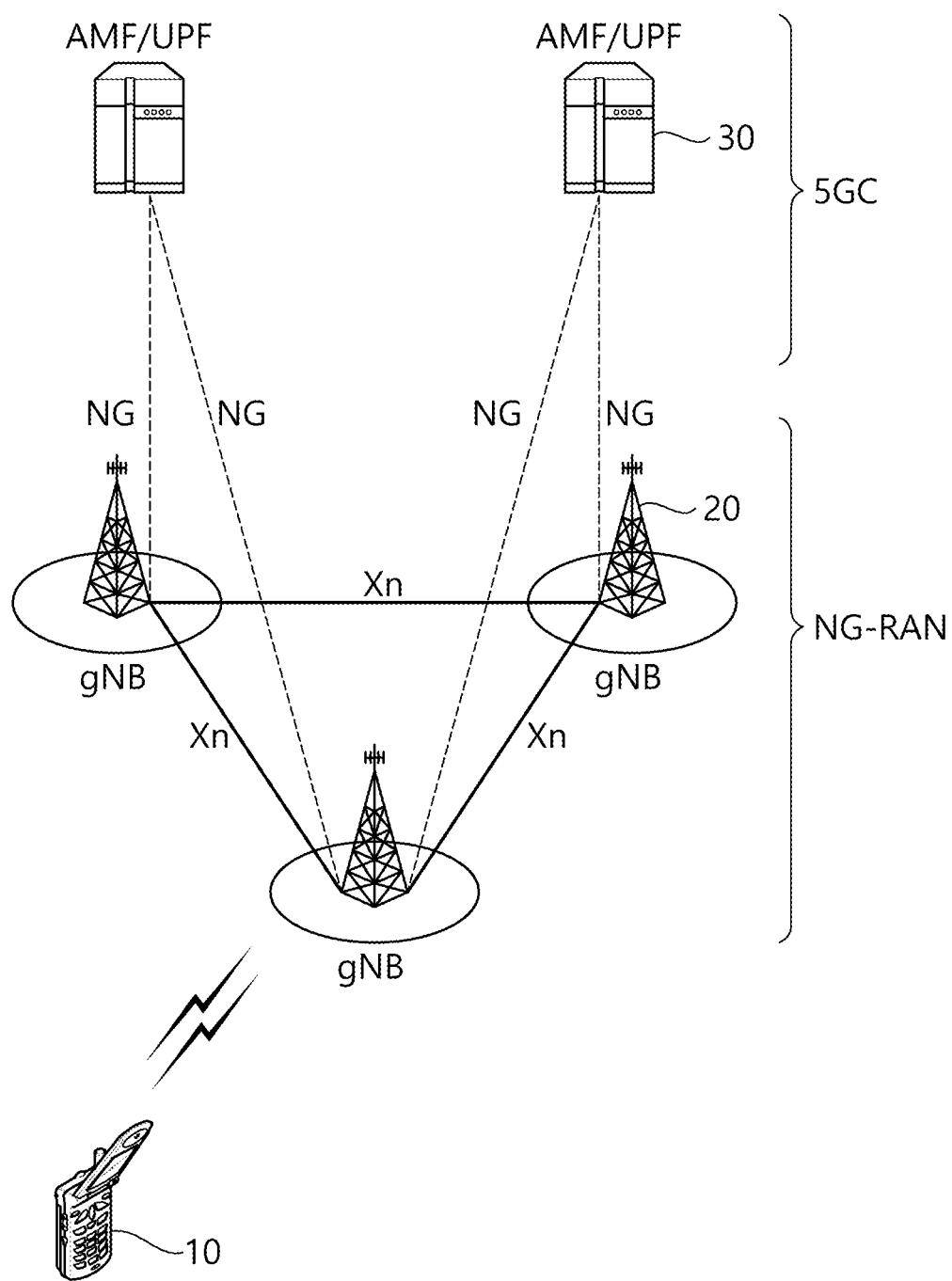
FIG. 2 shows a structure of an NR system, based on an embodiment of the present disclosure.

FIG. 2 shows a structure of an NR system, based on an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
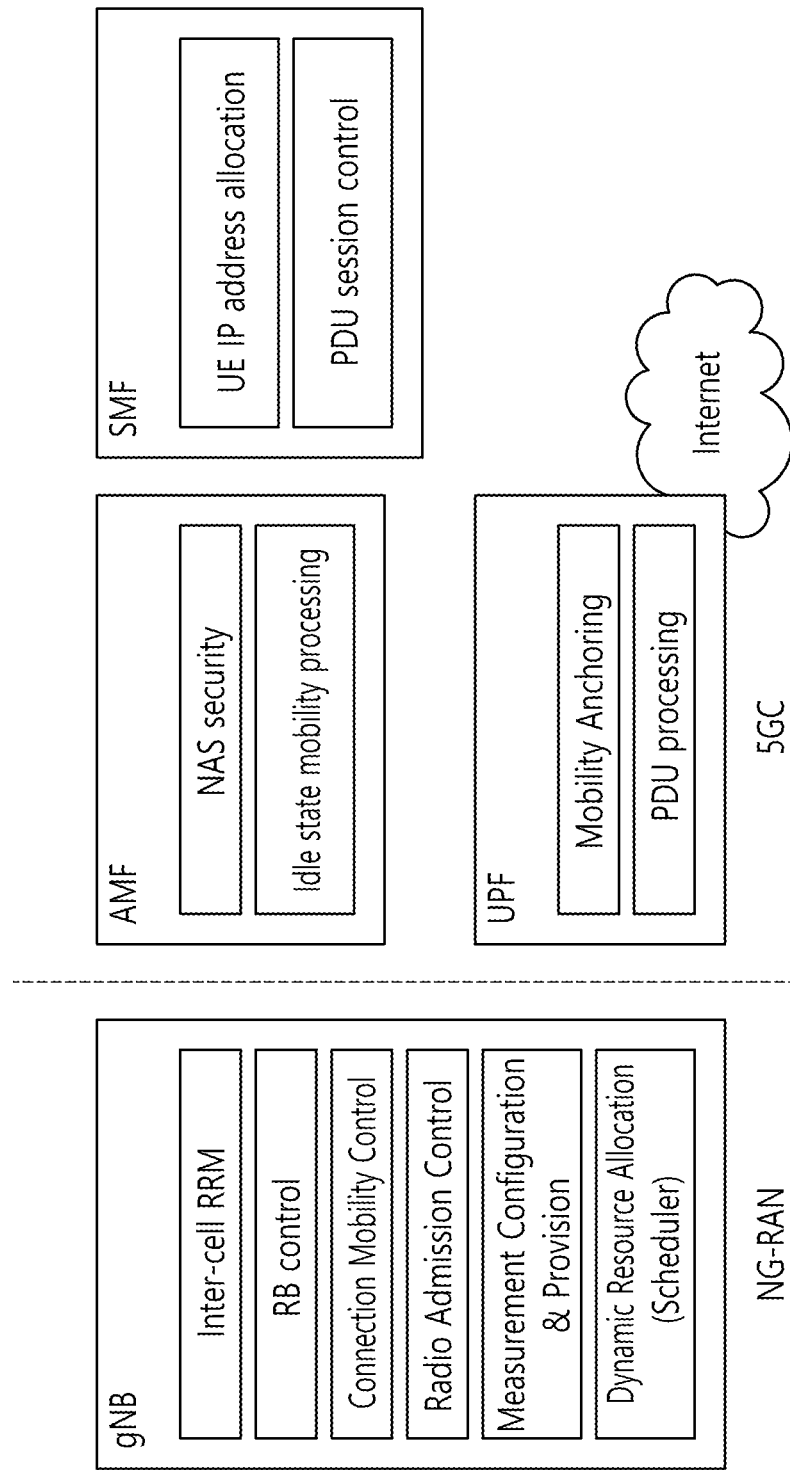
FIG. 3 shows a functional division between an NG-RAN and a 5GC, based on an embodiment of the present disclosure.

FIG. 3 shows a functional division between an NG-RAN and a 5GC, based on an embodiment of the present disclosure. The embodiment of FIG. 3 may be combined with various embodiments of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, based on an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
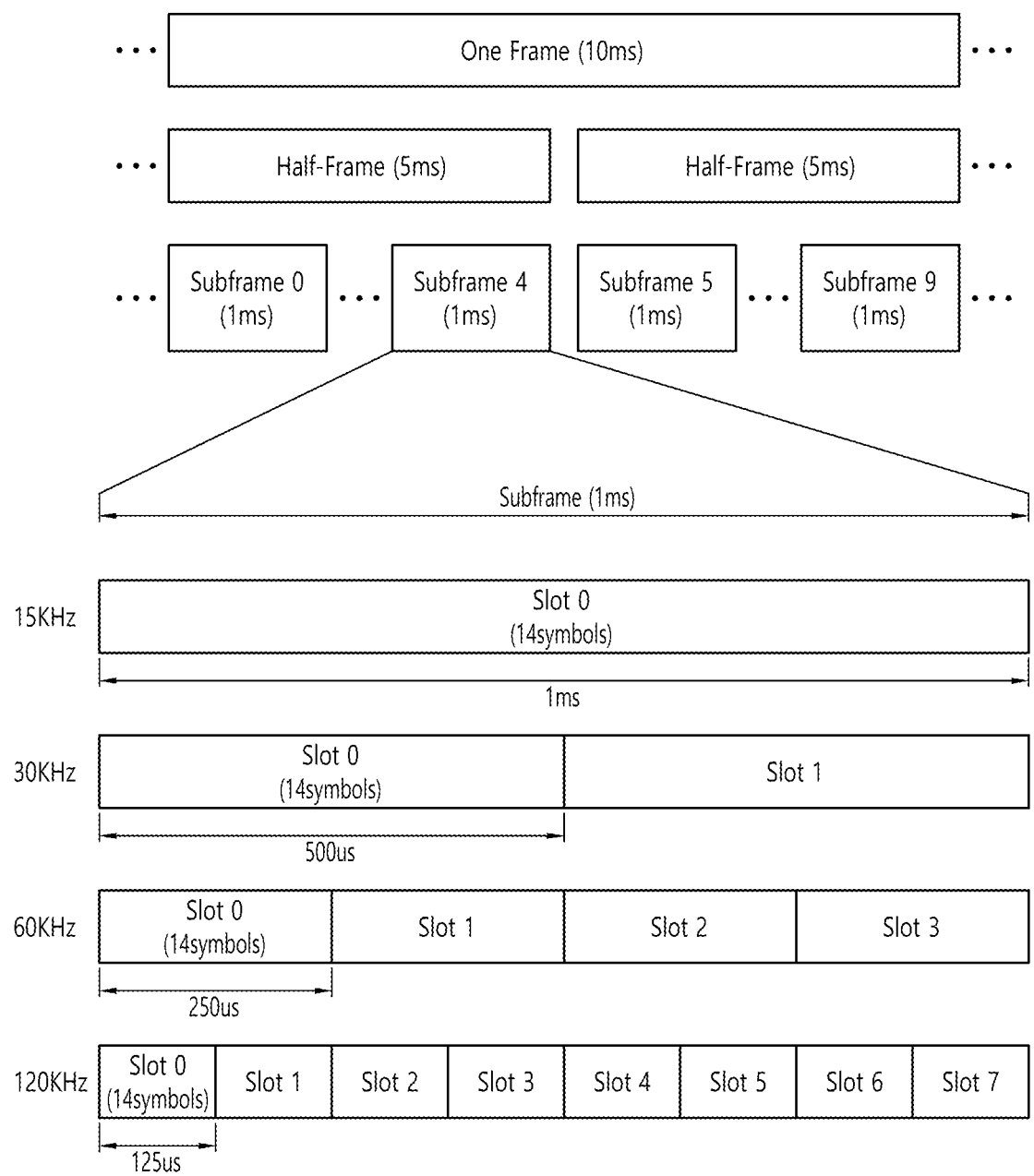
FIG. 5 shows a structure of an NR system, based on an embodiment of the present disclosure.

FIG. 5 shows a structure of an NR system, based on an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
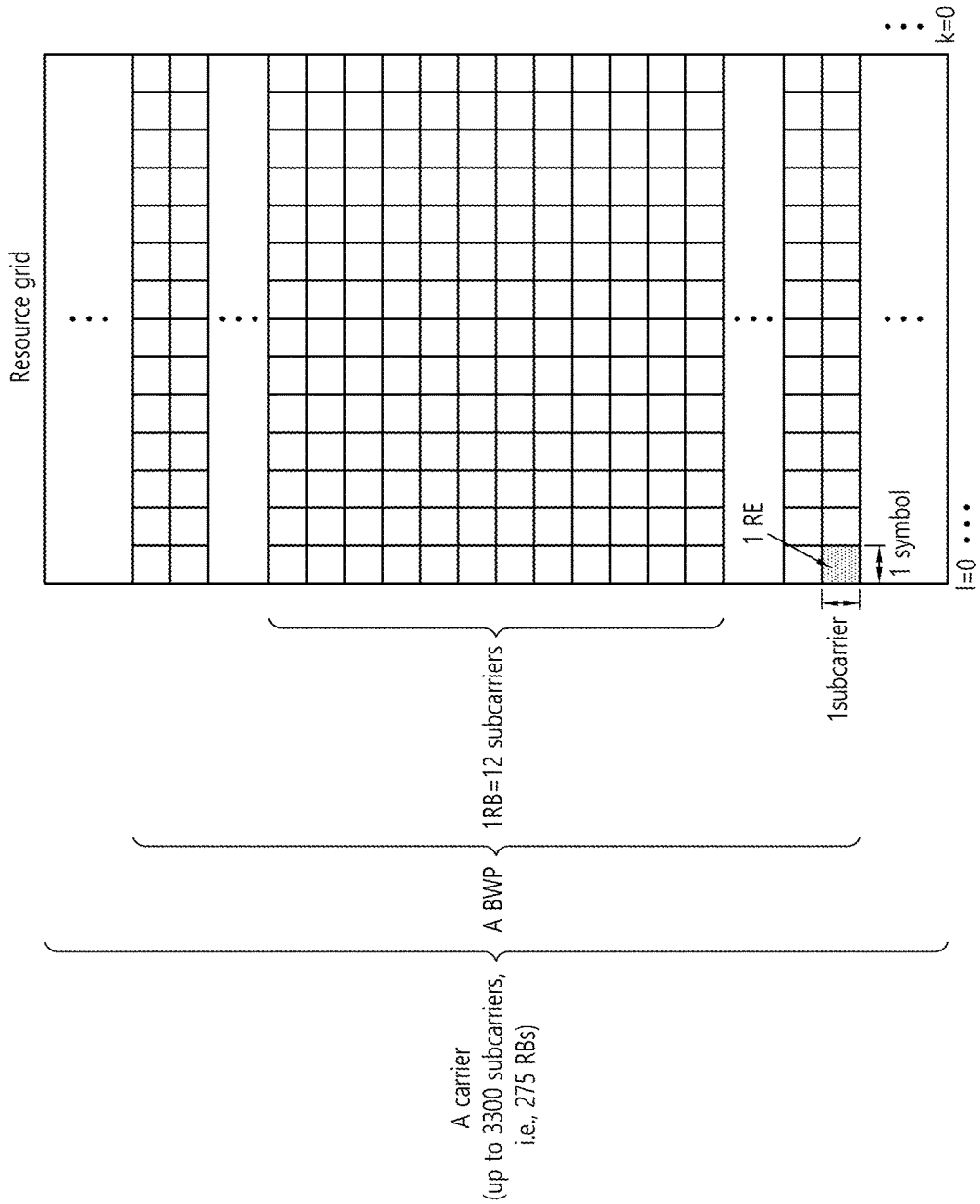
FIG. 6 shows a structure of a slot of an NR frame, based on an embodiment of the present disclosure.

FIG. 6 shows a structure of a slot of an NR frame, based on an embodiment of the present disclosure. The embodiment of FIG. 6 may be combined with various embodiments of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information—reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
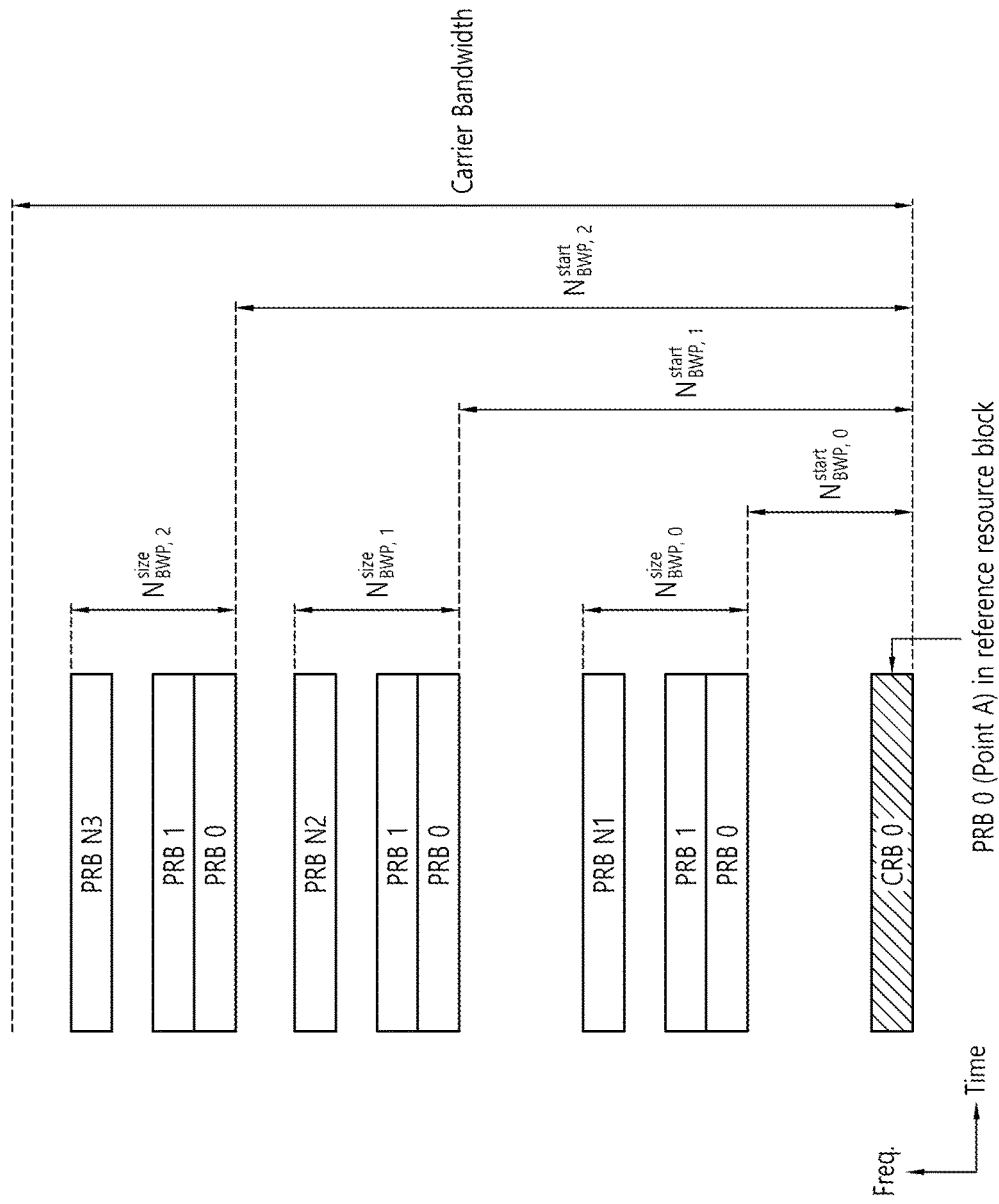
FIG. 7 shows an example of a BWP, based on an embodiment of the present disclosure.

FIG. 7 shows an example of a BWP, based on an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, based on an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
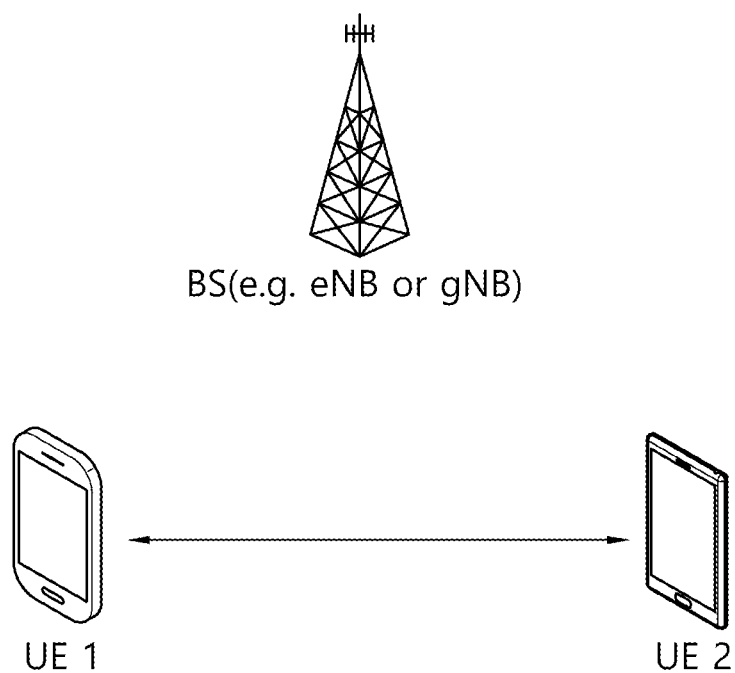
FIG. 9 shows a UE performing V2X or SL communication, based on an embodiment of the present disclosure.

FIG. 9 shows a UE performing V2X or SL communication, based on an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
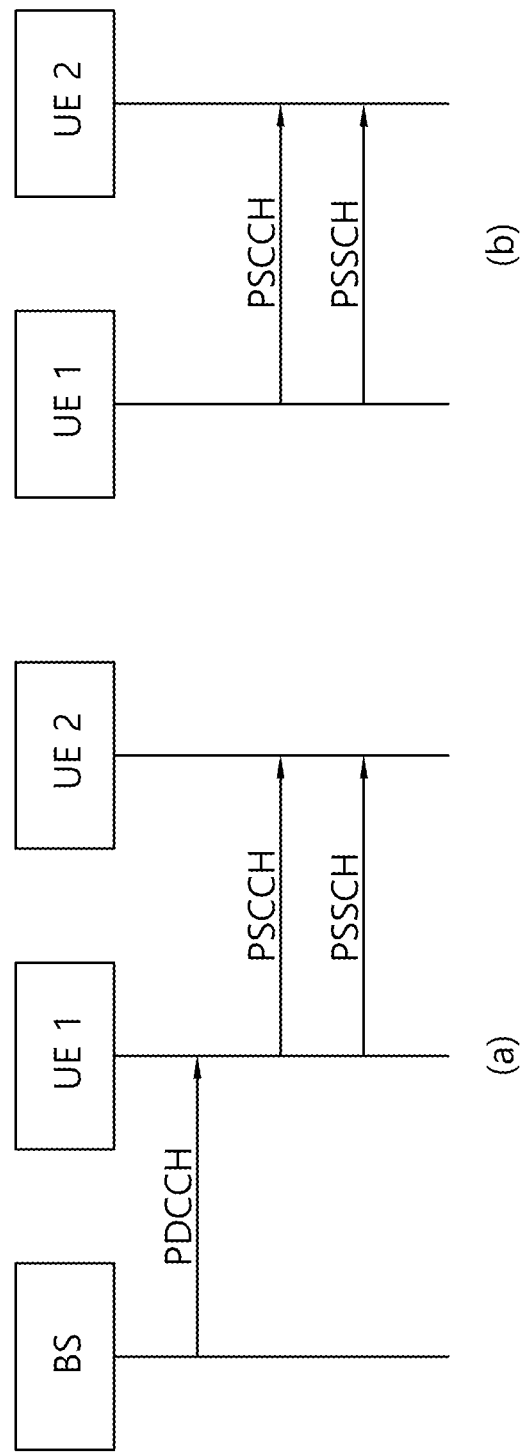
FIG. 10 shows a procedure of performing V2X or SL communication by a UE based on a transmission mode, based on an embodiment of the present disclosure.

FIG. 10 shows a procedure of performing V2X or SL communication by a UE based on a transmission mode, based on an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
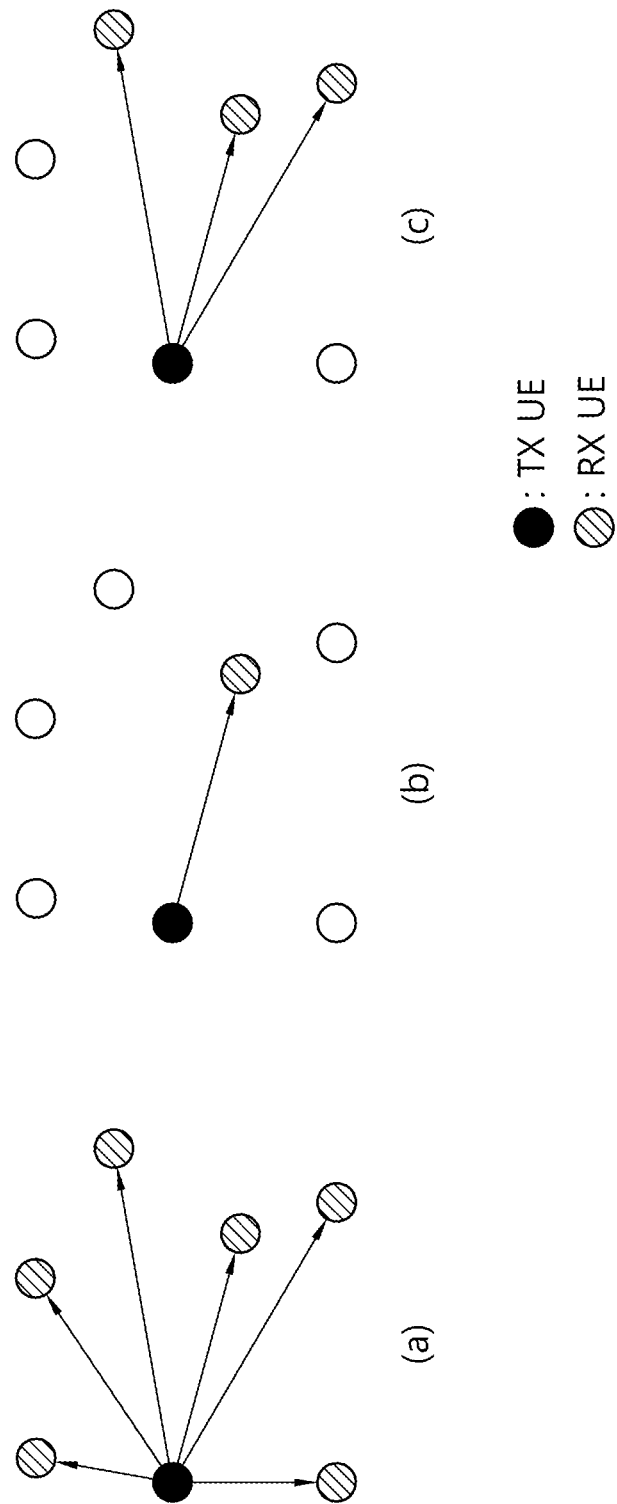
FIG. 11 shows three cast types, based on an embodiment of the present disclosure.

FIG. 11 shows three cast types, based on an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Figure 12:
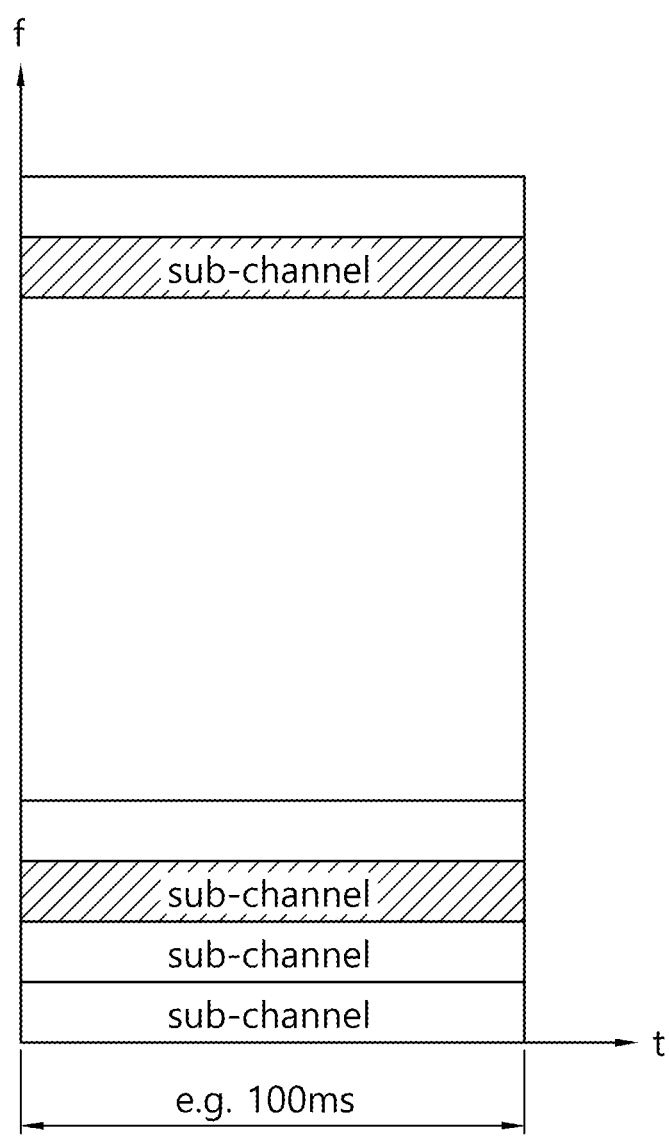
FIG. 12 shows a resource unit for CBR measurement, based on an embodiment of the present disclosure.

FIG. 12 shows a resource unit for CBR measurement, based on an embodiment of the present disclosure. The embodiment of FIG. 12 may be combined with various embodiments of the present disclosure.

Referring to FIG. 12, CBR may denote the number of sub-channels in which a measurement result value of a received signal strength indicator (RSSI) has a value greater than or equal to a pre-configured threshold as a result of measuring the RSSI by a UE on a sub-channel basis for a specific period (e.g., 100 ms). Alternatively, the CBR may denote a ratio of sub-channels having a value greater than or equal to a pre-configured threshold among sub-channels for a specific duration. For example, in the embodiment of FIG. 12, if it is assumed that a hatched sub-channel is a sub-channel having a value greater than or equal to a pre-configured threshold, the CBR may denote a ratio of the hatched sub-channels for a period of 100 ms. Additionally, the CBR may be reported to the BS.

Further, congestion control considering a priority of traffic (e.g. packet) may be necessary. To this end, for example, the UE may measure a channel occupancy ratio (CR). Specifically, the UE may measure the CBR, and the UE may determine a maximum value CRlimitk of a channel occupancy ratio k (CRk) that can be occupied by traffic corresponding to each priority (e.g., k) based on the CBR. For example, the UE may derive the maximum value CRlimitk of the channel occupancy ratio with respect to a priority of each traffic, based on a predetermined table of CBR measurement values. For example, in case of traffic having a relatively high priority, the UE may derive a maximum value of a relatively great channel occupancy ratio. Thereafter, the UE may perform congestion control by restricting a total sum of channel occupancy ratios of traffic, of which a priority k is lower than i, to a value less than or equal to a specific value. Based on this method, the channel occupancy ratio may be more strictly restricted for traffic having a relatively low priority.

In addition thereto, the UE may perform SL congestion control by using a method of adjusting a level of transmit power, dropping a packet, determining whether retransmission is to be performed, adjusting a transmission RB size (MCS coordination), or the like.

Hereinafter, power control will be described.

A method in which a UE controls uplink transmit power thereof may include open loop power control (OLPC) and closed loop power control (CLPC). Based on the OLPC, the UE may estimate a downlink pathloss from a BS of a cell to which the UE belongs, and the UE may perform power control in such a manner that the pathloss is compensated for. For example, based on the OLPC, if a distance between the UE and the BS further increases and thus a downlink pathloss increases, the UE may control uplink power in such a manner that uplink transmit power is further increased. Based on the CLPC, the UE may receive information (e.g., a control signal) required to adjust uplink transmit power from the BS, and the UE may control uplink power based on the information received from the BS. That is, based on the CLPC, the UE may control the uplink power based on a direct power control command received from the BS.

The OLPC may be supported in SL. Specifically, when the transmitting UE is inside the coverage of the BS, the BS may enable OPLC for unicast, groupcast, and broadcast transmission based on the pathloss between the transmitting UE and a serving BS of the transmitting UE. If the transmitting UE receives information/configuration for enabling the OLPC from the BS, the transmitting UE may enable OLPC for unicast, groupcast, or broadcast transmission. This may be to mitigate interference for uplink reception of the BS.

Additionally, at least in case of unicast, a configuration may be enabled to use the pathloss between the transmitting UE and the receiving UE. For example, the configuration may be pre-configured for the UE. The receiving UE may report an SL channel measurement result (e.g., SL RSRP) to the transmitting UE, and the transmitting UE may derive pathloss estimation from the SL channel measurement result reported by the receiving UE. For example, in SL, if the transmitting UE transmits a reference signal to the receiving UE, the receiving UE may estimate a channel between the transmitting UE and the receiving UE based on the reference signal transmitted by the transmitting UE. In addition, the receiving UE may transmit the SL channel measurement result to the transmitting UE. In addition, the transmitting UE may estimate the SL pathloss from the receiving UE based on the SL channel measurement result. In addition, the transmitting UE may perform SL power control by compensating for the estimated pathloss, and may perform SL transmission for the receiving UE. Based on the OLPC in SL, for example, if a distance between the transmitting UE and the receiving UE further increases and thus the SL pathloss increases, the transmitting UE may control SL transmit power in such a manner that the SL transmit power is further increased. The power control may be applied in SL physical channel (e.g., PSCCH, PSSCH, physical sidelink feedback channel (PSFCH)) and/or SL signal transmission.

In order to support the OLPC, at least in case of unicast, long-term measurement (e.g., L3 filtering) may be supported on SL.

For example, total SL transmit power may be identical in symbols used for PSCCH and/or PSSCH transmission in a slot. For example, maximum SL transmit power may be configured for the transmitting UE or may be pre-configured.

For example, in case of the SL OLPC, the transmitting UE may be configured to use only a downlink pathloss (e.g., a pathloss between the transmitting UE and the BS). For example, in case of the SL OLPC, the transmitting UE may be configured to use only an SL pathloss (e.g., a pathloss between the transmitting UE and the receiving UE). For example, in case of the SL OLPC, the transmitting UE may be configured to use a downlink pathloss and the SL pathloss.

For example, if the SL OLPC is configured to use both the downlink pathloss and the SL pathloss, the transmitting UE may determine a minimum value as transmit power among power obtained based on the downlink pathloss and power obtained based on the SL pathloss. For example, P0 and an alpha value may be configured separately for the downlink pathloss and the SL pathloss or may be pre-configured. For example, P0 may be a user-specific parameter related to signal to interference plus noise ratio (SINR) received on average. For example, the alpha value may be a weight value for the pathloss.

In the present disclosure, a transmitting UE may be a UE which transmits data (e.g., a PSCCH and/or a PSSCH) to a (target) receiving UE. A transmitting UE may be a UE which transmits reference signal(s) for measuring sidelink channel state information (sidelink channel state information reference signal, SL CSI-RS) and/or sidelink channel state information report request indicator (or sidelink channel state information report request information) to a (target) receiving UE. A transmitting UE may be a UE which transmits reference signal(s) for measuring sidelink reference signal received power (RSRP) and/or a sidelink RSRP report request indicator (or sidelink RSRP report request information) to a (target) receiving UE. In this case, for example, the sidelink RSRP may be an RSRP measurement value calculated using filtering of a layer-1 (L1). For example, the reference signal(s) for measuring the sidelink RSRP may be pre-defined reference signal(s). For example, the reference signal(s) for measuring the RSRP may be PSSCH demodulation reference signal(s) (DMRS(s)), DMRS(s) for a PSSCH, or DMRS(s) related to a PSSCH. A transmitting UE may be a UE which transmits channel(s) for a (target) receiving UE's sidelink radio link monitoring (SL RLM) operation and/or sidelink radio link failure (SL RLF) operation. A transmitting UE may be a UE which transmits reference signal(s) (e.g., DMRS(s) or CSI-RS(s)) through channel(s) for SL RLM operation and/or SL RLF operation of a (target) receiving UE. In this case, for example, the channel(s) for the SL RLM operation and/or the SL RLF operation of the receiving UE may be a PSCCH or a PSSCH.

In the present disclosure, a receiving UE may be a UE which transmits SL HARQ feedback information (to a transmitting UE), based on whether or not decoding of data received from the transmitting UE is succeeded and/or whether or not detection/decoding of a PSCCH (related to the scheduling of a PSSCH) transmitted by the transmitting UE is succeeded. A receiving UE may be a UE which performs SL CSI transmission (to a transmitting UE), based on SL CSI-RS(s) and/or a SL CSI report request indicator (or SL CSI report request information) received from the transmitting UE. A receiving UE may be a UE which transmits a sidelink RSRP measurement value (to a transmitting UE), based on (pre-defined) reference signal(s) and/or a sidelink RSRP report request indicator (or sidelink RSRP report request information) received from the transmitting UE. In this case, for example, the sidelink RSRP may be an RSRP measurement value calculated using filtering of a layer-1 (L1). A receiving UE may be a UE which performs data transmission of the receiving UE (to a transmitting UE). For example, a receiving UE may be a UE which performs SL RLM operation and/or SL RLF operation, based on (pre-configured) channel(s) received from a transmitting UE and/or reference signal(s) received through the channel(s). In this case, for example, the channel(s) may be a control channel.

In the present disclosure, the term "configure or define" may be interpreted as being pre-configured or configured (through pre-defined signaling (e.g., SIB, MAC signaling, RRC signaling)) from a base station or a network. For example, "A may be configured" may include that "a base station or a network may (pre-)configure/define or inform A to a UE". Alternatively, the term "configure or define" may be interpreted as being configured or defined in advance by the system. For example, "A may be configured" may include that "A may be configured/defined in advance by the system".

In the present disclosure, a resource block (RB) may be replaced with a subcarrier.

In the present disclosure, a packet or a traffic may be replaced with a transport block (TB) or a medium access control protocol data unit (MAC PDU) according to a communication layer.

In the present disclosure, a receiving UE may transmit (to a transmitting UE) at least one of sidelink HARQ feedback, SL CSI, and sidelink RSRP. In the present disclosure, a physical channel used when the receiving UE transmits at least one of sidelink HARQ feedback, sidelink CSI, or sidelink RSRP (to the transmitting UE) may be referred to as a physical sidelink feedback channel (PSFCH) or a sidelink feedback channel. In this case, for example, the sidelink RSRP may be an RSRP measurement value calculated using filtering of a layer-1 (L1). For example, the sidelink RSRP may be an RSRP measurement value calculated using filtering of a layer-3 (L3).

In the present disclosure, when a receiving UE transmits sidelink HARQ feedback information for a PSSCH and/or a PSCCH transmitted from a transmitting UE, at least one of the following methods may be applied. Alternatively, at least one of the following methods may be limitedly applied only when the receiving UE successfully detects and/or decodes the PSSCH for scheduling the PSSCH.

Method A: The receiving UE may transmit negative-acknowledgement (NACK) information only if decoding and/or reception of the PSSCH transmitted from the transmitting UE is failed.

Method B: If the receiving UE succeeds in decoding and receiving the PSSCH transmitted from the transmitting UE, the receiving UE may transmit acknowledgment (ACK) information, and if the receiving UE fails to decode the PSSCH transmitted from the transmitting UE, the receiving UE may transmit NACK information.

Meanwhile, a transmitting UE may transmit at least one of the following information to a receiving UE through a sidelink control information (SCI).

- PSSCH and/or PSCCH related resource allocation information. For example, it may be location of time-frequency resource(s) allocated or scheduled for PSSCH transmission and/or PSCCH transmission, and/or the number of time-frequency resources allocated or scheduled for PSSCH transmission and/or PSCCH transmission, and/or information related to resource reservation (e.g., a period of resource reservation).
- SL CSI report request indicator (or related information), and/or SL (L1) RSRP report request indicator (or related information), and/or SL (L1) reference signal received quality (RSRQ) report request indicator (or related information), and/or SL (L1) received signal strength indicator (RSSI) report request indicator (or related information). In this case, The (L1) may mean that each of the SL RSRP, the SL RSRQ, and the SL RSSI is a measured value calculated using filtering of a layer-1 (L1).
- SL CSI transmission indicator (or related information) on a time-frequency resource region allocated or scheduled for PSSCH transmission, and/or SL RSRP information transmission indicator (or related information), and/or SL RSRQ information transmission indicator (or related information), and/or SL RSSI information transmission indicator (or related information)
- Modulation Coding Scheme (MCS) information Transmit power information L1 destination ID information and/or L1 source ID information SL HARQ Process ID information New Data Indicator (NDI)

Redundancy Version (RV)

QoS information related to traffic(s) and/or packet(s) transmitted. For example, it may be information related to a priority of traffic(s) and/or packet(s) transmitted.

SL CSI-RS transmission indicator (or related information) and/or information related to the number of (transmitted) SL CSI-RS antenna ports Location information of the transmitting UE and/or location information of the target receiving UE (for which transmission of SL HARQ feedback information is requested) and/or information related to the distance range of the target receiving UE (for which transmission of SL HARQ feedback information is requested)

Information related to reference signal(s) related to decoding (and/or demodulation and/or channel estimation) of data transmitted through the PSSCH. For example, it may be information related to a time-frequency mapping pattern and/or information related to rank (or layer) and/or information related to an antenna port index of the reference signal(s). For example, the reference signal(s) may be DMRS(s).

In the present disclosure, a PSCCH may be replaced with a SCI. Additionally/alternatively, a PSCCH may be replaced with a first SCI or a second SCI only if a transmitting UE transmits two-stage SCI to a receiving UE. Additionally/alternatively, a SCI may be replaced with a PSCCH. Additionally/alternatively, only if a transmitting UE transmits two-stage SCI to a receiving UE, a SCI may be replaced with a first SCI or a second SCI. Additionally/alternatively, only if a transmitting UE transmits two-stage SCI to a receiving UE and a second SCI is transmitted through a PSSCH, the PSSCH may be replaced with the second SCI. For example, considering the size of the (relatively) high SCI payload, the entire SCI field information is divided into two SCI field information groups (e.g., the first SCI field information group and the second SCI field information group). In this case, a SCI including each SCI field information group may be referred to as the first SCI or the second SCI. For example, a transmitting UE may transmit the first SCI and the second SCI to a receiving UE through different channels. Specifically, for example, the transmitting UE may transmit the first SCI to the receiving UE through the PSCCH, and may transmit the second SCI to the receiving UE in a piggyback form together with data through the PSSCH. Alternatively, the transmitting UE may transmit the first SCI to the receiving UE through a PSCCH, and may transmit the second SCI to the receiving UE through an independent PSCCH.

Figure 13:
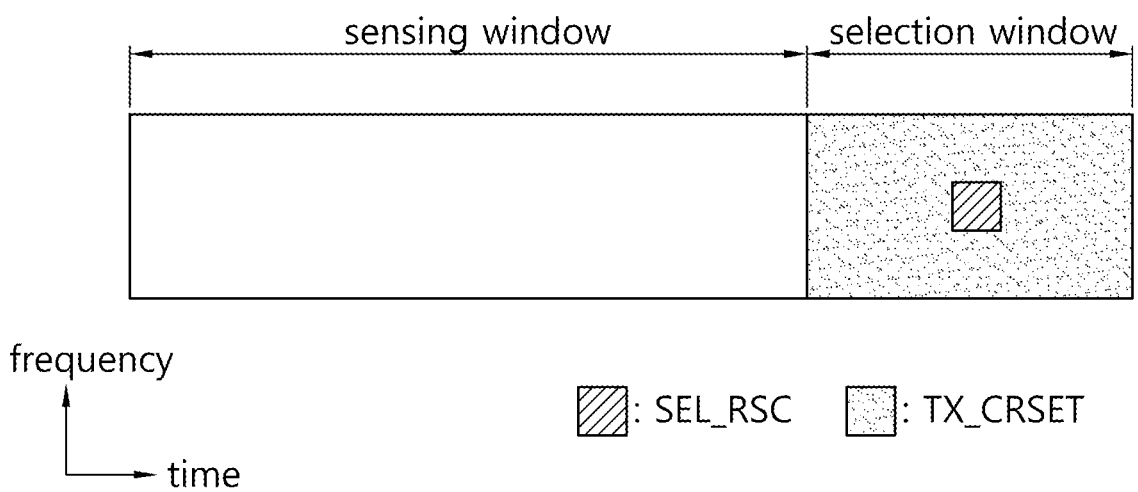
FIG. 13 shows a method for a UE to select resource(s) based on sensing, based on an embodiment of the present disclosure.

FIG. 13 shows a method for a UE to select resource(s) based on sensing, based on an embodiment of the present disclosure. The embodiment of FIG. 13 may be combined with various embodiments of the present disclosure.

Referring to FIG. 13, a TX UE having packet(s) and/or channel(s) to transmit (in its buffer) may perform a sensing operation for a transmission resource candidate set (hereinafter, TX_CRSET) within a sensing window of a pre-configured (time) length (e.g., 1 second). For example, the TX UE may identify and exclude resource(s) with higher interference (than a pre-configured threshold) from TX_CRSET, by using PSCCH decoding, RSRP measurement value(s) for PSSCH DM-RS(s), and/or RSSI measurement value(s) for subchannel(s), etc. Herein, for example, a time domain to which TX_CRSET belongs may be referred to as a selection window. In addition, for example, the TX UE may exclude resource(s) with high interference (than a pre-configured threshold) from TX_CRSET within the selection window, and the TX UE may (randomly) select its own transmission resource(s) from the remaining resources. Herein, for example, for convenience of description, the transmission resource(s) (randomly) selected by the TX UE may be referred to as SEL_RSC.

Based on an embodiment of the present disclosure, additionally, in order to further mitigate the problem of transmission resource conflict between different TX UEs, the TX UE may perform a sensing operation continuously until its own SEL_RSC in the selection window is actually used for transmission of packet(s) and/or channel(s).

Figure 14:
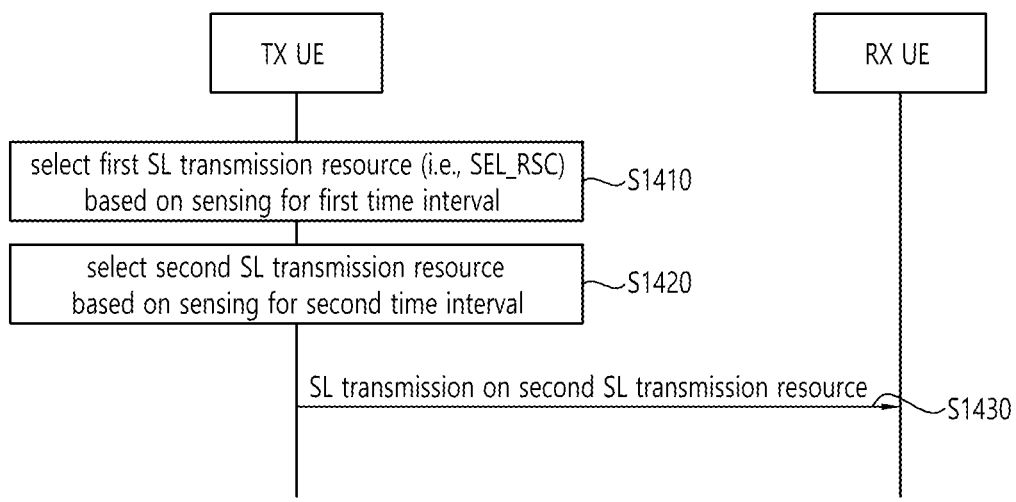
FIGS. 14 and 15 show a method of performing a sensing operation until a UE actually uses selected resource(s) for transmission of packet(s) and/or channel(s), based on an embodiment of the present disclosure.
Figure 15:
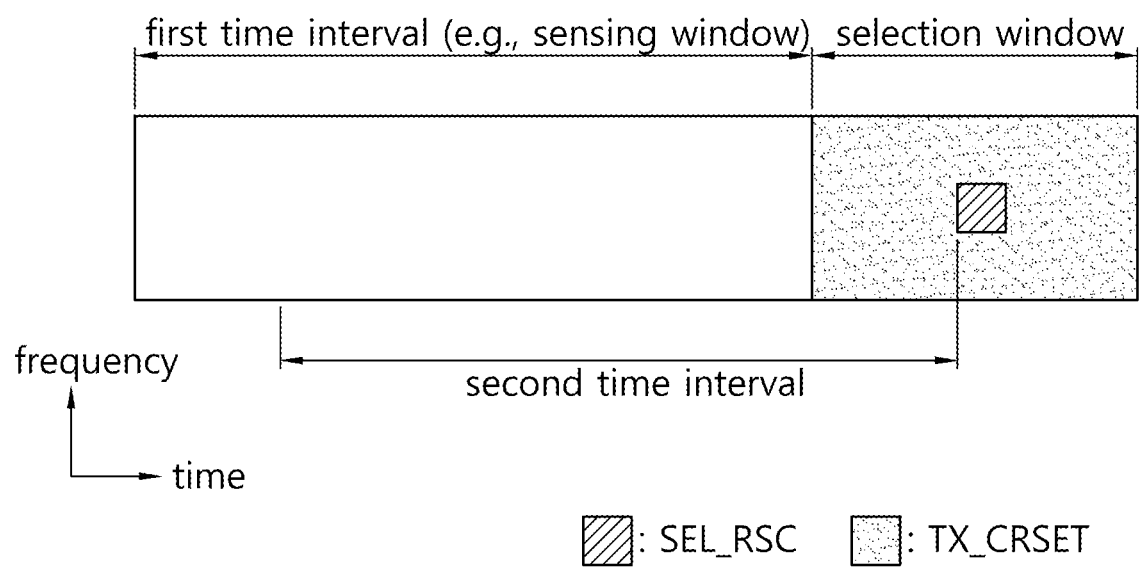

FIGS. 14 and 15 show a method of performing a sensing operation until a UE actually uses selected resource(s) for transmission of packet(s) and/or channel(s), based on an embodiment of the present disclosure. The embodiments of FIGS. 14 and 15 may be combined with various embodiments of the present disclosure.

Referring to FIGS. 14 and 15, in step S1410, a TX UE having packet(s) and/or channel(s) to transmit (in its buffer) may perform a sensing operation for TX_CRSET within a sensing window of a pre-configured (time) length (e.g., 1 second) or a first time interval. In addition, for example, the TX UE may exclude resource(s) with higher interference (than a pre-configured threshold) from TX_CRSET within a selection window, and the TX UE may select SEL_RSC from the remaining resources.

In step S1420, the TX UE may perform the sensing operation continuously until its own SEL_RSC in the selection window is actually used for transmission of packet(s) and/or channel(s). For example, the TX UE may continuously perform the sensing operation during a second time period. For example, through such a sensing operation, if the TX UE determines that SEL_RSC (of the TX UE) collides/overlaps with transmission resource(s) of other TX UE(s), the TX UE may perform a reselection operation for SEL_RSC based on the (part of) proposed method below. For example, through such a sensing operation, if the TX UE determines that SEL_RSC (of the TX UE) collides/overlaps with transmission resource(s) of other TX UE(s), the TX UE may perform a cancellation operation for SEL_RSC based on the (part of) proposed method below. For example, if the TX UE determines that SEL_RSC (of the TX UE) collides/overlaps with transmission resource(s) of other TX UE(s), the TX UE may select a second SL transmission resource if at least one of the conditions described below is satisfied. Herein, for example, a first SL transmission resource (i.e., SEL_RSC) may be canceled.

For example, the TX UE may transmit a channel for protecting a TB-related initial transmission resource (hereinafter, INTX_RSC) and/or a TB-related retransmission resource (hereinafter, RETX_RSC). For example, the channel may be transmitted to protect INTX_RSC and/or RETX_RSC in terms of interference. For convenience of description, the channel transmitted by the TX UE to protect INTX_RSC and/or RETX_RSC may be referred to as PRE_RSVSIG. For example, INTX_RSC may be a resource selected/reserved for initial transmission by the TX UE, and RETX_RSC may be resource(s) selected/reserved for retransmission by the TX UE. For example, PRE_RSVSIG may be transmitted in the form of PSCCH only or in the form of a PSCCH and a PSSCH (related to the PSCCH). For example, PRE_RSVSIG may be transmitted in the form of PSCCH only or a PSCCH and a (related) PSSCH before INTX_RSC.

For example, whether or not the TX UE is allowed to transmit PRE_RSVSIG may be configured differently for the TX UE based on a type of a service. For example, whether or not the TX UE is allowed to transmit PRE_RSVSIG may be configured differently for the TX UE based on a priority of a service. For example, whether or not the TX UE is allowed to transmit PRE_RSVSIG may be configured differently for the TX UE based on service requirements (e.g., priority, reliability, latency, minimum required communication range, etc.). For example, whether or not the TX UE is allowed to transmit PRE_RSVSIG may be configured differently for the TX UE based on a cast type (e.g., unicast, groupcast, broadcast). For example, whether or not the TX UE is allowed to transmit PRE_RSVSIG may be configured differently for the TX UE based on a congestion level. For example, if the requirement related to the latency is less than a pre-configured threshold, the TX UE may not be allowed to transmit PRE_RSVSIG. For example, if the requirement related to the priority is higher than a pre-configured threshold, the TX UE may not be allowed to transmit PRE_RSVSIG. For example, if the requirement related to the reliability is higher than a pre-configured threshold, the TX UE may not be allowed to transmit PRE_RSVSIG. For example, if the congestion level is higher than a pre-configured threshold, the TX UE may not be allowed to transmit PRE_RSVSIG.

For example, if the requirement related to the priority is lower than a pre-configured threshold, the TX UE may not be allowed to transmit PRE_RSVSIG. For example, if the requirement related to the reliability is lower than a pre-configured threshold, the TX UE may not be allowed to transmit PRE_RSVSIG.

For example, whether or not the TX UE is allowed to reserve a potential HARQ retransmission resource may be configured differently for the TX UE based on a type of a service. For example, whether or not the TX UE is allowed to reserve a potential HARQ retransmission resource may be configured differently for the TX UE based on a priority of a service. For example, whether or not the TX UE is allowed to reserve a potential HARQ retransmission resource may be configured differently for the TX UE based on service requirements (e.g., priority, reliability, latency, minimum required communication range, etc.). For example, whether or not the TX UE is allowed to reserve a potential HARQ retransmission resource may be configured differently for the TX UE based on a cast type (e.g., unicast, groupcast, broadcast). For example, whether or not the TX UE is allowed to reserve a potential HARQ retransmission resource may be configured differently for the TX UE based on a congestion level.

For example, when the TX UE transmits PSCCH (only) related to PRE_RSVSIG, the TX UE may transmit pre-configured dummy information/packet(s) by mapping it on the first symbol (e.g., for automatic gain control (AGC)) (in a slot). For example, when the TX UE transmits PSCCH (only) related to PRE_RSVSIG, the TX UE may transmit a part of dummy information/packet(s) to be transmitted on a PSSCH (related to the PSCCH) by mapping it on the first symbol (e.g., for AGC) (in a slot). For example, when the TX UE transmits PSCCH (only) related to PRE_RSVSIG, the TX UE may transmit a part of packet(s) to be transmitted on INTX_RSC and/or RETX_RSC by mapping it on the first symbol (e.g., for AGC) (in a slot). In the above-described embodiment, for example, the TX UE may transmit SCI-related information by mapping it (actually) from the second symbol (in the slot). Herein, for example, the size of a frequency resource on the first symbol may be (1) assumed to be the same as the size of a frequency resource of a PSCCH related to PRE_RSVSIG, or (2) defined as a pre-configured value (e.g., one sub-channel). Herein, for example, the TX UE may apply a pre-configured MCS value (e.g., QPSK) to the information/packet(s) mapped on the first symbol. Herein, for example, the TX UE may determine/derive transmit power for the first symbol based on power control parameter related to the PSCCH or the PSSCH (e.g., PO, ALPHA). Herein, for example, when the TX UE signals the power value used for PSSCH transmission in the PSCCH, the TX UE may transmit PRE_RSVSIG in the form of PSCCH only by setting transmit power value of the PSSCH to minus infinity.

Based on an embodiment of the present disclosure, if the following (part of) conditions are satisfied, in step S1420, the TX UE may perform the reselection operation for SEL_RSC. For example, if the following (part of) conditions are not satisfied, in step S1420, the TX UE may perform the cancellation operation for SEL_RSC. For example, if the following (part of) conditions are not satisfied, the TX UE may cancel/omit the SEL_RSC-based transmission operation.

Herein, for example, (corresponding) SEL_RSC may be (transmission) resource(s) selected/reserved by the TX UE to transmit PRE_RSVSIG. For example, (corresponding) SEL_RSC may be (transmission) resource(s) selected/reserved for initial transmission and/or retransmission (related to TB(s)) by the TX UE.

For example, if the following (part of) conditions are not satisfied, the TX UE may not perform the reselection operation for SEL_RSC. For example, if the following (part of) conditions are not satisfied, the TX UE may perform SL transmission using SEL_RSC. For example, if the following (part of) conditions are not satisfied, the TX UE may drop packet(s) to be transmitted on SEL_RSC.

1) First Condition

For example, before the TX UE transmits PRE_RSVSIG, if the TX UE determines that SEL_RSC of the TX UE collides/overlaps with transmission resource(s) of other TX UE(s), and/or For example, before the TX UE transmits the PRE_RSVSIG, if the TX UE determines that SEL_RSC for PRE_RSVSIG transmission of the TX UE collides/overlaps with transmission resource(s) of other TX UE(s), and/or For example, before the TX UE transmits the PRE_RSVSIG, if the TX UE determines that SEL_RSC for initial transmission and/or retransmission (related to TB(s)) of the TX UE collides/oberlpas with transmission resource(s) of other TX UE(s), and/or For example, after the TX UE transmits PRE_RSVSIG, if the TX UE determines that SEL_RSC of the TX UE collides/overlaps with transmission resource(s) of other TX UE(s), and/or For example, after the TX UE transmits PRE_RSVSIG, if the TX UE determines that SEL_RSC for initial transmission and/or retransmission (related to TB(s)) of the TX UE collides/oberlpas with transmission resource(s) of other TX UE(s), and/or 2) Second Condition
- For example, if an interference level of a resource virtually reselected by the TX UE (hereinafter, VIR_RSC) is relatively less than an interference level of (existing) SEL_RSC, and/or
- For example, if an interference level of VIR_RSC compared to an interference level of SEL_RSC is less than a pre-configured offset value (hereinafter, INF_OFF), and/or
- For example, if an interference level of VIR_RSC is less than a pre-configured threshold (hereinafter, INF_THD), and/or
- For example, if the second condition is not satisfied, the TX UE may perform transmission of packet(s)/channel(s) by using (existing) SEL_RSC as it is. For example, if the second condition is not satisfied, the TX UE may cancel transmission of packet(s)/channel(s).

3) Third Condition
- For example, if the (remaining) selection window length in which the TX UE can perform reselection for SEL_RSC is longer than a pre-configured threshold, and/or
- For example, if the number of (remaining) candidate transmission resources from which the TX UE is reselectable is greater than a pre-configured threshold, for example, if the number of (remaining) candidate transmission resources from which the TX UE is reselectable with an interference level lower than a (pre-configured) threshold (hereinafter, NOS_THD) is greater than a pre-configured threshold, and/or
- For example, if an average interference level of the (remaining) candidate resources from which the TX UE is reselectable within the (remaining) selection window is lower than a pre-configured threshold, for example, if an average interference level of the lower X % candidate resources with a low interference level among the (remaining) candidate resources from which the TX UE is reselectable within the length of the (remaining) selection window is lower than a pre-configured threshold, for example, if an average interference level of the higher Y % candidate resources with a high interference level among the (remaining) candidate resources from which the TX UE is reselectable within the length of the (remaining) selection window is lower than a pre-configured threshold, and/or
- For example, if the TX UE is able to select as many reselection resources as required for the TX UE within the (remaining) selection window, and/or
- For example, the pre-configured threshold may be configured or per-configured for the TX UE. For example, the pre-configured threshold may be an interference level value measured by the TX UE for SEL_RSC (previously).

For example, the third condition may be a condition for lowering the probability of collision of transmission resources between different TX UEs to a certain level or less.

4) Fourth Condition
- For example, if a priority of service(s)/packet(s) of other TX UE(s) collided/overlapped is higher than a priority of service(s)/packet(s) of its own (i.e., the TX UE), and/or
- For example, if a requirement of service(s)/packet(s) of other TX UE(s) collided/overlapped is higher than a requirement of service(s)/packet(s) of its own (i.e., the TX UE), and/or
- For example, if a priority of service(s)/packet(s) of other TX UE(s) collided/overlapped is higher than a pre-configured threshold (hereinafter, REQ_THD), and/or
- For example, if a requirement of service(s)/packet(s) of other TX UE(s) collided/overlapped is higher than REQ_THD;
  - For example, INF_OFF value may be configured differently for the TX UE based on a type of a service. For example, INF_OFF value may be configured differently for the TX UE based on a priority of a service. For example, INF_THD value may be configured differently for the TX UE based on service requirements. For example, INF_OFF value may be configured differently for the TX UE based on a cast type. For example, INF_OFF value may be configured differently for the TX UE based on a congestion level.

For example, INF_THD value may be configured differently for the TX UE based on a type of a service. For example, INF_THD value may be configured differently for the TX UE based on a priority of a service. For example, INF_THD value may be configured differently for the TX UE based on service requirements. For example, INF_THD value may be configured differently for the TX UE based on a cast type. For example, INF_THD value may be configured differently for the TX UE based on a congestion level.

For example, NOS_THD value may be configured differently for the TX UE based on a type of a service. For example, NOS_THD value may be configured differently for the TX UE based on a priority of a service. For example, NOS_THD value may be configured differently for the TX UE based on service requirements. For example, NOS_THD value may be configured differently for the TX UE based on a cast type. For example, NOS_THD value may be configured differently for the TX UE based on a congestion level.

For example, REQ_THD value may be configured differently for the TX UE based on a type of a service. For example, REQ_THD value may be configured differently for the TX UE based on a priority of a service. For example, REQ_THD value may be configured differently for the TX UE based on service requirements. For example, REQ_THD value may be configured differently for the TX UE based on a cast type. For example, REQ_THD value may be configured differently for the TX UE based on a congestion level.

In step S1430, the TX UE may perform SL transmission based on the second SL transmission resource. For example, if at least one of the above conditions is satisfied, the TX UE may cancel the selection of the first SL transmission resource and select the second SL transmission resource to perform SL transmission.

Based on various embodiments of the present disclosure, the TX UE may perform the sensing operation continuously until SEL_RSC of the TX UE within the selection window is actually used for packet transmission and/or channel transmission. In addition, if the TX UE determines that SEL_RSC (of the TX UE) collides/overlaps with transmission resource(s) of other TX UE(s), the TX UE may efficiently perform the reselection operation for SEL_RSC. For example, the TX UE may determine whether or not to perform reselection for SEL_RSC by considering a priority of packet(s) to be transmitted, the TX UE may determine whether or not to perform reselection for SEL_RSC so as not to increase channel congestion.

Figure 16:
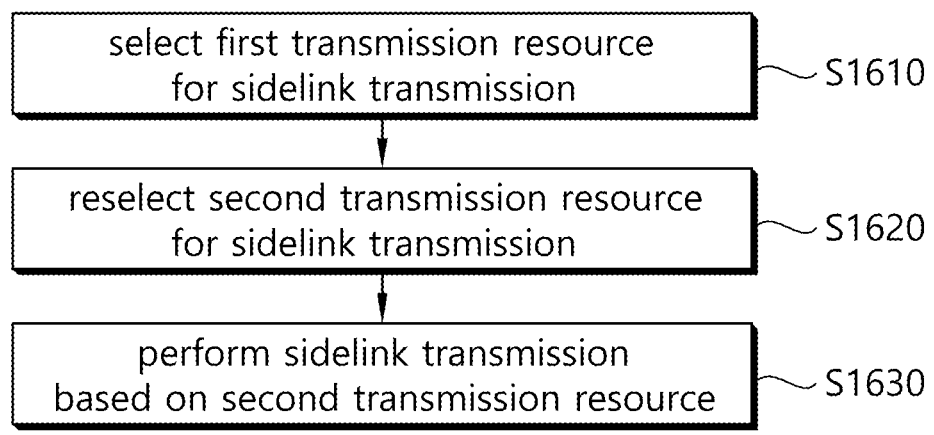
FIG. 16 shows a method for a transmitting UE to reselect transmission resource(s), based on an embodiment of the present disclosure.

FIG. 16 shows a method for a transmitting UE to reselect transmission resource(s), based on an embodiment of the present disclosure. The embodiment of FIG. 16 may be combined with various embodiments of the present disclosure.

Referring to FIG. 16, in step S1610, the transmitting UE may select a first transmission resource for sidelink transmission. In step S1620, the transmitting UE may reselect a second transmission resource for sidelink transmission. In step S1630, the transmitting UE may perform sidelink transmission based on the second transmission resource. For example, the first transmission resource and the second transmission resource may be different resources. The proposed method can be applied to the device(s) described below.

Figure 17:
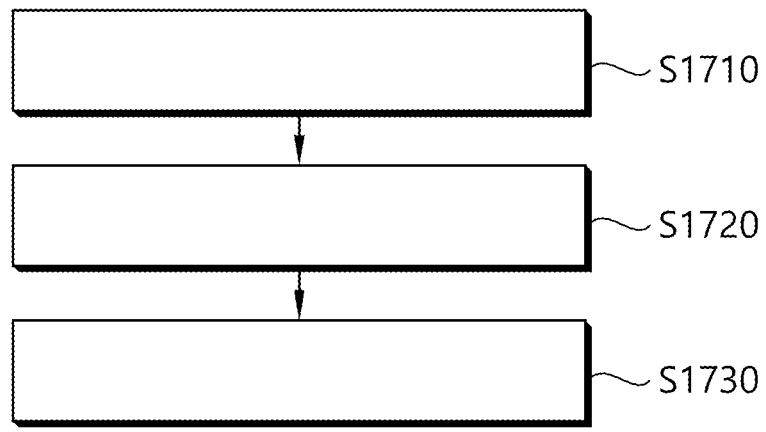
FIG. 17 shows a method for a first device to perform wireless communication, based on an embodiment of the present disclosure.

FIG. 17 shows a method for a first device to perform wireless communication, based on an embodiment of the present disclosure. The embodiment of FIG. 17 may be combined with various embodiments of the present disclosure.

Referring to FIG. 17, in step S1710, the first device may select a first sidelink (SL) transmission resource within a selection window, based on sensing for a first time interval. In step S1720, the first device may select a second SL transmission resource, based on sensing for a second time interval. In step S1730, the first device may perform SL transmission using the second SL transmission resource. Herein, for example, the second time interval may be a time interval prior to the first SL transmission resource.

For example, the selected first SL transmission resource may be canceled.

For example, the first SL transmission resource may be a resource selected by the first device for transmitting a channel related to reservation of an initial transmission resource.

For example, the first SL transmission resource may be a resource selected by the first device for initial transmission or retransmission.

For example, the second SL transmission resource may be selected by the first device based on the first SL transmission resource being overlapped with a transmission resource of at least one second device. Additionally, for example, the first device may determine, by the UE, that the first SL transmission resource overlaps the transmission resource of the at least one second device, before transmitting a channel related to reservation of an initial transmission resource. Additionally, for example, the first device may determine, by the UE, that the first SL transmission resource overlaps the transmission resource of the at least one second device, after transmitting a channel related to reservation of an initial transmission resource.

For example, the second SL transmission resource may be selected by the first device, based on an interference level of the second SL transmission resource being less than an interference level of the first SL transmission resource.

For example, the second SL transmission resource may be selected by the first device, based on a length of a remaining selection window among the selection window being longer than a threshold. For example, the threshold may be configured differently for the first device based on at least one of a service type, a service priority, a service requirement, a cast type, or a congestion level.

For example, the second SL transmission resource may be selected by the first device, based on a number of candidate transmission resources in a remaining selection window among the selection window is greater than a first threshold. For example, the candidate transmission resources may be at least one resource with an interference level less than a second threshold.

For example, the second SL transmission resource may be selected by the first device, based on a priority of a packet to be transmitted on the first SL transmission resource by at least one second device being higher than a priority of a packet to be transmitted on the first SL transmission resource by the first device.

For example, a length of the first time interval and a length of the second time interval may be pre-configured for the first device, and the length of the second time interval may be equal to the length of the first time interval.

For example, the second time interval may be a time interval with a pre-configured length from a time before the first device transmits a SCI related to service(s)/packet(s) to be transmitted on the first SL transmission resource.

The proposed method can be applied to device(s) described below. First, the processor 102 of the first device 100 may select a first sidelink (SL) transmission resource within a selection window, based on sensing for a first time interval. In addition, the processor 102 of the first device 100 may select a second SL transmission resource, based on sensing for a second time interval. In addition, the processor 102 of the first device 100 may control the transceiver 106 to perform SL transmission using the second SL transmission resource. Herein, for example, the second time interval may be a time interval prior to the first SL transmission resource.

Based on an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: select a first sidelink (SL) transmission resource within a selection window, based on sensing for a first time interval; select a second SL transmission resource, based on sensing for a second time interval; and perform SL transmission using the second SL transmission resource. Herein, for example, the second time interval may be a time interval prior to the first SL transmission resource.

Based on an embodiment of the present disclosure, an apparatus configured to control a first user equipment (UE) performing wireless communication may be provided. For example, the apparatus may comprise: one or more processors; and one or more memories operably connected to the one or more processors and storing instructions. For example, the one or more processors may execute the instructions to: select a first sidelink (SL) transmission resource within a selection window, based on sensing for a first time interval; select a second SL transmission resource, based on sensing for a second time interval; and perform SL transmission using the second SL transmission resource. Herein, for example, the second time interval may be a time interval prior to the first SL transmission resource.

Based on an embodiment of the present disclosure, a non-transitory computer-readable storage medium storing instructions may be provided. For example, the instructions, when executed, may cause a first device to: select a first sidelink (SL) transmission resource within a selection window, based on sensing for a first time interval; select a second SL transmission resource, based on sensing for a second time interval; and perform SL transmission using the second SL transmission resource. Herein, for example, the second time interval may be a time interval prior to the first SL transmission resource.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 18:
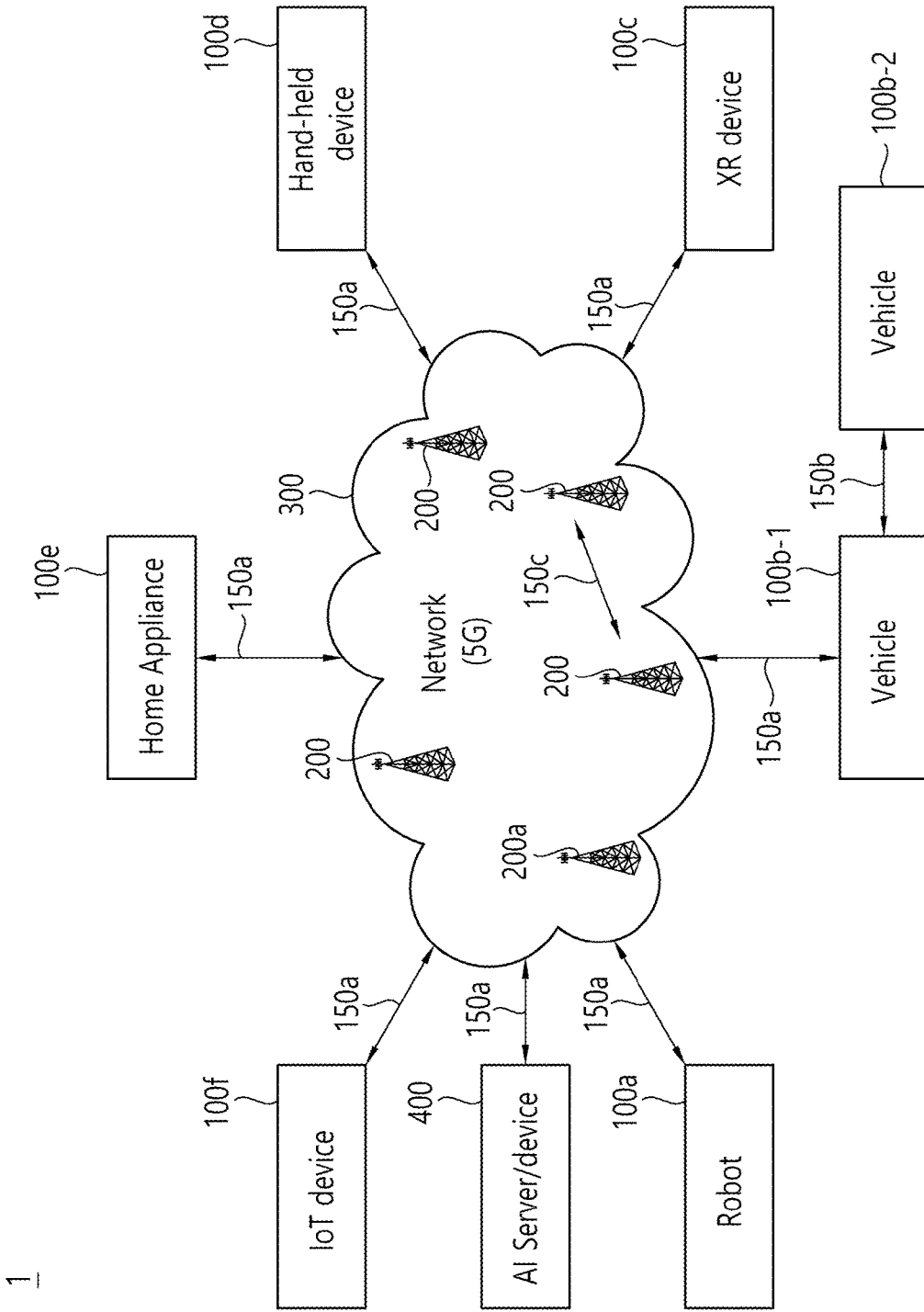
FIG. 18 shows a communication system 1, based on an embodiment of the present disclosure.

FIG. 18 shows a communication system 1, based on an embodiment of the present disclosure.

Referring to FIG. 18, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g., relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 19:
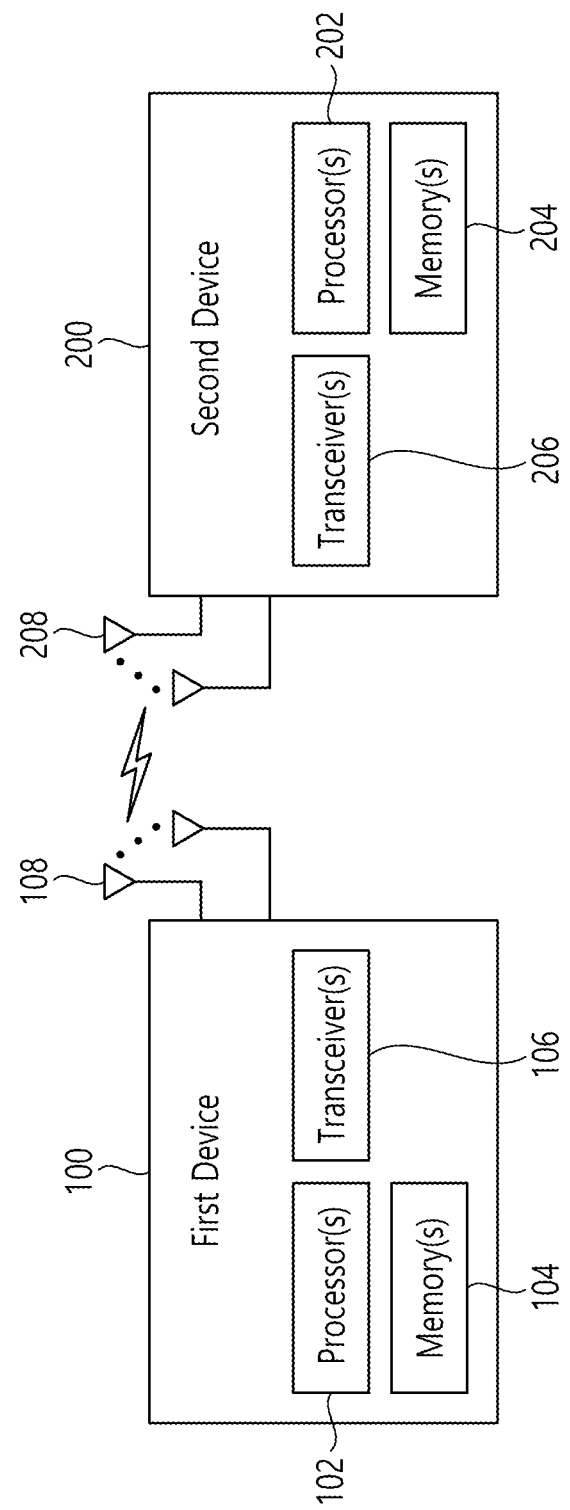
FIG. 19 shows wireless devices, based on an embodiment of the present disclosure.

FIG. 19 shows wireless devices, based on an embodiment of the present disclosure.

Referring to FIG. 19, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 20:
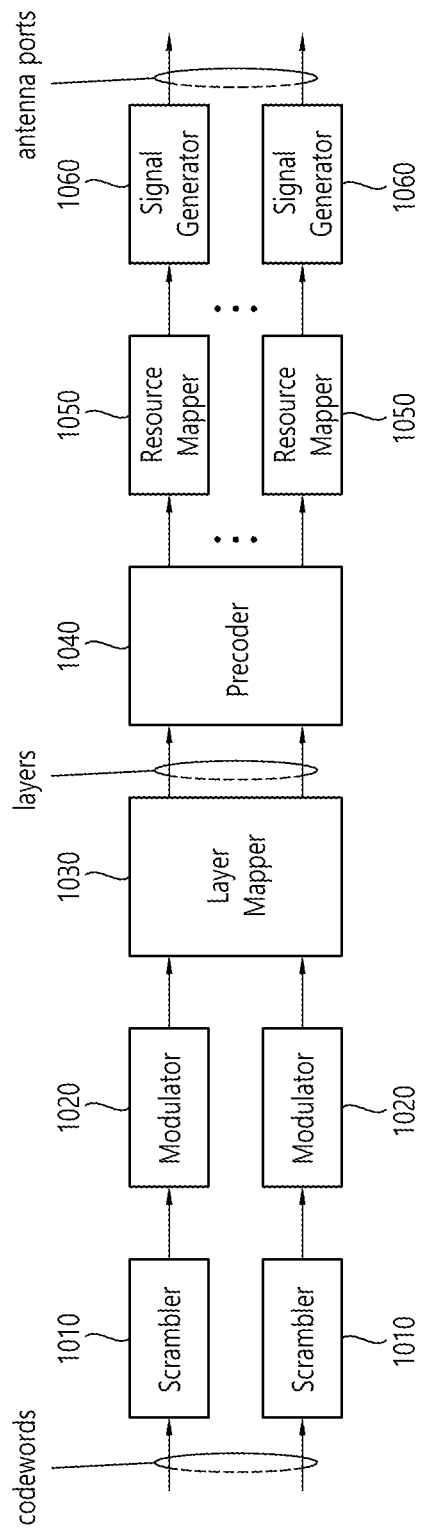
FIG. 20 shows a signal process circuit for a transmission signal, based on an embodiment of the present disclosure.

FIG. 20 shows a signal process circuit for a transmission signal, based on an embodiment of the present disclosure.

Referring to FIG. 20, a signal processing circuit 1000 may include scramblers 1010, modulators 1020, a layer mapper 1030, a precoder 1040, resource mappers 1050, and signal generators 1060. An operation/function of FIG. 20 may be performed, without being limited to, the processors 102 and 202 and/or the transceivers 106 and 206 of FIG. 19. Hardware elements of FIG. 20 may be implemented by the processors 102 and 202 and/or the transceivers 106 and 206 of FIG. 19. For example, blocks 1010 to 1060 may be implemented by the processors 102 and 202 of FIG. 19. Alternatively, the blocks 1010 to 1050 may be implemented by the processors 102 and 202 of FIG. 19 and the block 1060 may be implemented by the transceivers 106 and 206 of FIG. 19.

Codewords may be converted into radio signals via the signal processing circuit 1000 of FIG. 20. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 20. For example, the wireless devices (e.g., 100 and 200 of FIG. 19) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 21:
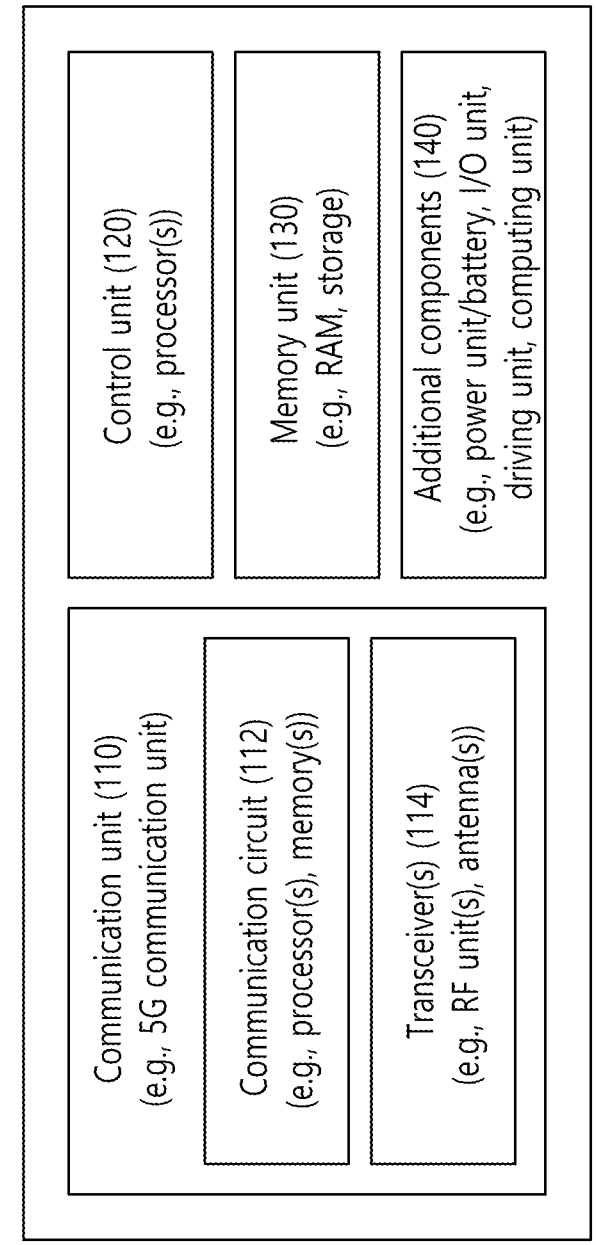
FIG. 21 shows another example of a wireless device, based on an embodiment of the present disclosure.

FIG. 21 shows another example of a wireless device, based on an embodiment of the present disclosure. The wireless device may be implemented in various forms according to a use-case/service (refer to FIG. 18).

Referring to FIG. 21, wireless devices 100 and 200 may correspond to the wireless devices 100 and 200 of FIG. 19 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcast terminal, a hologram device, a public safety device, an MTC device, a medicine device, a fintech device (or a finance device), a security device, a climate/environment device, the AI server/device (400 of FIG. 18), the BSs (200 of FIG. 18), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 21 will be described in detail with reference to the drawings.

Figure 22:
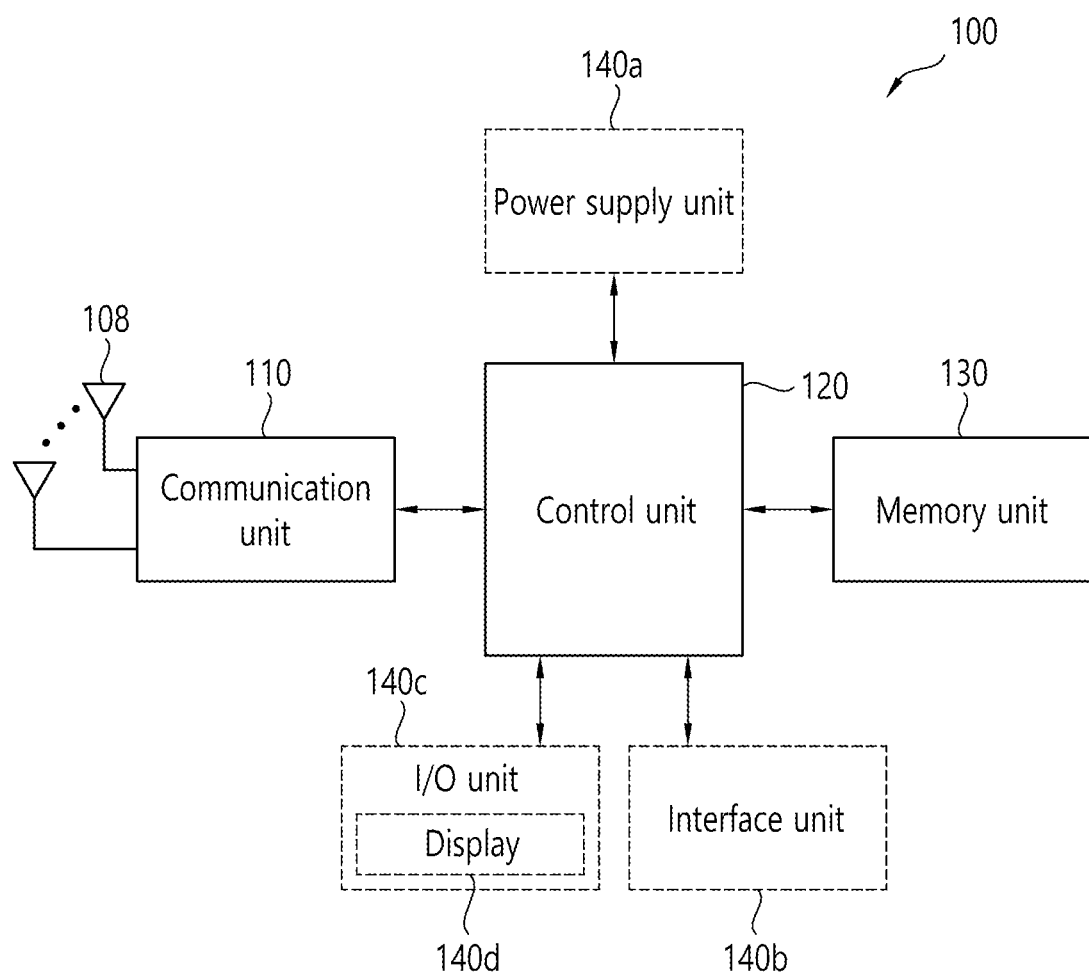
FIG. 22 shows a hand-held device, based on an embodiment of the present disclosure.

FIG. 22 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 22, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 21, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 23:
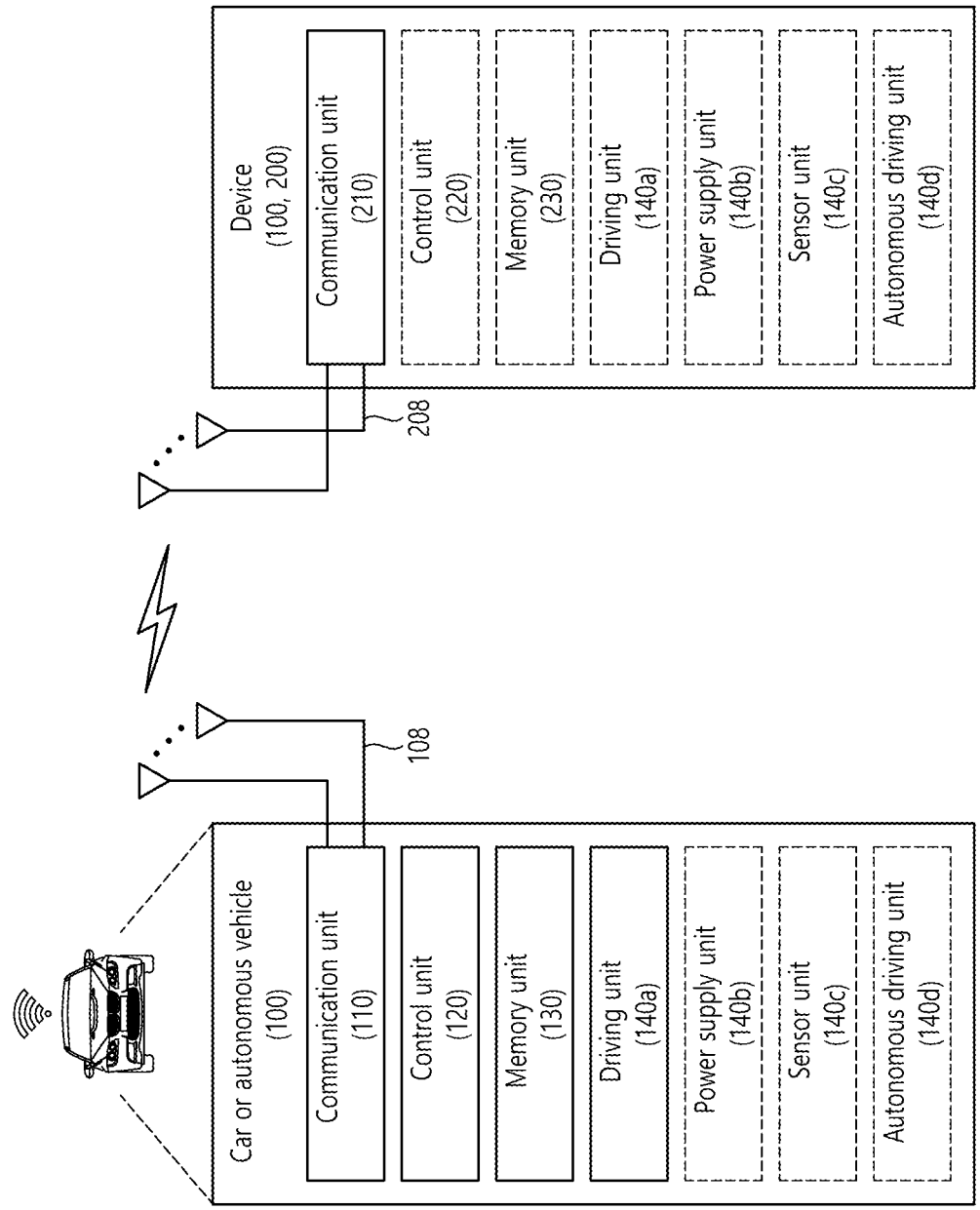
FIG. 23 shows a vehicle or an autonomous vehicle, based on an embodiment of the present disclosure.

FIG. 23 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc.

Referring to FIG. 23, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:
selecting a first sidelink (SL) transmission resource within a selection window, based on sensing for a first time interval;
triggering resource selection for selecting a second SL transmission resource;
selecting the second SL transmission resource, based on sensing for a second time interval; and
performing SL transmission using the second SL transmission resource,
wherein the second time interval is a time interval prior to the first SL transmission resource,
wherein the resource selection for selecting the second SL transmission resource is triggered by the first device, based on a length of a remaining selection window being longer than a first threshold, and
wherein the first threshold is a value that makes a collision probability of transmission resources lower than a certain collision level.

2. The method of claim 1, wherein the selected first SL transmission resource is canceled.

3. The method of claim 1, wherein the first SL transmission resource is a resource selected by the first device for transmitting a channel related to a reservation of an initial transmission resource.

4. The method of claim 1, wherein the first SL transmission resource is a resource selected by the first device for initial transmission or retransmission.

5. The method of claim 1, wherein the second SL transmission resource is selected by the first device based on the first SL transmission resource being overlapped with a transmission resource of at least one second device.

6. The method of claim 5, further comprising:
determining, by the UE, that the first SL transmission resource overlaps the transmission resource of the at least one second device, before transmitting a channel related to a reservation of an initial transmission resource.

7. The method of claim 5, further comprising:
determining, by the UE, that the first SL transmission resource overlaps the transmission resource of the at least one second device, after transmitting a channel related to a reservation of an initial transmission resource.

8. The method of claim 1, wherein the second SL transmission resource is selected by the first device, based on an interference level of the second SL transmission resource being less than an interference level of the first SL transmission resource.

9. The method of claim 1, wherein the first threshold is configured differently for the first device based on at least one of a service type, a service priority, a service requirement, a cast type, or a congestion level.

10. The method of claim 1, wherein the second SL transmission resource is selected by the first device, based on a number of candidate transmission resources in the remaining selection window being greater than a second threshold.

11. The method of claim 10, wherein the candidate transmission resources include at least one resource with an interference level less than a third threshold.

12. The method of claim 1, wherein the second SL transmission resource is selected by the first device, based on a priority of a packet to be transmitted on the first SL transmission resource by at least one second device being higher than a priority of a packet to be transmitted on the first SL transmission resource by the first device.

13. The method of claim 1,
wherein a length of the first time interval and a length of the second time interval are pre-configured for the first device, and
wherein the length of the second time interval is equal to the length of the first time interval.

14. A first device configured to perform wireless communication, the first device comprising:
at least one transceiver;
at least one processor; and
at least one memory connected to the at least one processor and storing instructions that, based on being executed the first device to preform operation comprising:
selecting a first sidelink (SL) transmission resource within a selection window, based on sensing for a first time interval;
triggering resource selection for selecting a second SL transmission resource;
selecting the second SL transmission resource, based on sensing for a second time interval; and
performing SL transmission using the second SL transmission resource,
wherein the second time interval is a time interval prior to the first SL transmission resource,
wherein the resource selection for selecting the second SL transmission resource is triggered by the first device, based on a length of a remaining selection window being longer than a first threshold, and
wherein the first threshold is a value that makes a collision probability of transmission resources lower than a certain collision level.

15. An apparatus configured to control a first user equipment (UE) performing wireless communication, the apparatus comprising:
at least one processor; and
at least one memory connected to the at least one processor and storing instructions that, based on being executed the first UE to preform operation comprising:
selecting a first sidelink (SL) _transmission resource within a selection window, based on sensing for a first time interval;
triggering resource selection for selecting a second SL transmission resource;
selecting the second SL transmission resource, based on sensing for a second time interval; and
performing SL transmission using the second SL transmission resource,
wherein the second time interval is a time interval prior to the first SL transmission resource,
wherein the resource selection for selecting the second SL transmission resource is triggered by the first device, based on a length of a remaining selection window being longer than a first threshold, and
wherein the first threshold is a value that makes a collision probability of transmission resources lower than a certain collision level.

16. The first device of claim 14, wherein the selected first SL transmission resource is canceled.

17. The first device of claim 14, wherein the first SL transmission resource is a resource selected by the first device for transmitting a channel related to a reservation of an initial transmission resource.

18. The first device of claim 14, wherein the first SL transmission resource is a resource selected by the first device for initial transmission or retransmission.

19. The first device of claim 14, wherein the second SL transmission resource is selected by the first device based on the first SL transmission resource being overlapped with a transmission resource of at least one second device.

20. The first device of claim 14, wherein the first threshold is configured differently for the first device based on at least one of a service type, a service priority, a service requirement, a cast type, or a congestion level.

* * * * *